(12) United States Patent
Nakaguma et al.

(10) Patent No.: US 8,363,313 B2
(45) Date of Patent: Jan. 29, 2013

(54) YTTERBIUM-DOPED OPTICAL FIBER, FIBER LASER, AND FIBER AMPLIFIER

(75) Inventors: Teruno Nakaguma, Sakura (JP); Kentaro Ichii, Sakura (JP); Shoji Tanigawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 178 days.

(21) Appl. No.: 12/907,622

(22) Filed: Oct. 19, 2010

(65) Prior Publication Data

US 2011/0026106 A1 Feb. 3, 2011

Related U.S. Application Data

(63) Continuation of application No. PCT/JP2009/006136, filed on Nov. 16, 2009.

(30) Foreign Application Priority Data

Nov. 14, 2008 (JP) ................................ 2008-292013
Feb. 18, 2009 (WO) ................. PCT/JP2009/052756

(51) Int. Cl.
*H01S 3/067* (2006.01)
*C03C 13/04* (2006.01)
*C03C 3/04* (2006.01)
*G02B 6/02* (2006.01)
*C03C 4/08* (2006.01)

(52) U.S. Cl. .......... 359/341.5; 501/37; 501/53; 385/127

(58) Field of Classification Search .......... 359/333–349; 372/6; 385/123–128

See application file for complete search history.

(56) References Cited

U.S. PATENT DOCUMENTS

| 4,830,463 | A | | 5/1989 | Lemaire et al. |
| 5,559,921 | A | * | 9/1996 | Terasawa et al. ............. 385/124 |
| 5,937,134 | A | | 8/1999 | DiGiovanni |
| 5,966,491 | A | | 10/1999 | DiGiovanni |
| 6,560,009 | B1 | | 5/2003 | Andrejco et al. |
| 7,006,752 | B2 | * | 2/2006 | Dragic .......................... 385/142 |
| 7,371,703 | B2 | * | 5/2008 | Masumura et al. ............. 501/44 |
| 7,570,856 | B1 | * | 8/2009 | Minelly et al. ................ 385/126 |

(Continued)

FOREIGN PATENT DOCUMENTS

| JP | 01-298043 A | 12/1989 |
| JP | 01-298043 A | 12/1989 |

(Continued)

OTHER PUBLICATIONS

Ming-Jun Li, et al., "Effective Area Limit for Large Mode Area Laser Fibers," the Proceedings of OFC 2008, 3 pages, OTuJ2.

(Continued)

*Primary Examiner* — Isam Alsomiri
*Assistant Examiner* — Ari M Diacou
(74) *Attorney, Agent, or Firm* — Sughrue Mion, PLLC

(57) ABSTRACT

An ytterbium-doped optical fiber of the present invention includes: a core which contains ytterbium, aluminum, and phosphorus and does not contain germanium; and a cladding which surrounds this core. The ytterbium concentration in the core in terms of ytterbium oxide is 0.09 to 0.68 mole percent. The molar ratio between the phosphorus concentration in the core in terms of diphosphorus pentoxide and the above ytterbium concentration in terms of ytterbium oxide is 3 to 30. The molar ratio between the aluminum concentration in the core in terms of aluminum oxide and the above ytterbium concentration in terms of ytterbium oxide is 3 to 32. The molar ratio between the above aluminum concentration in terms of aluminum oxide and the above phosphorus concentration in terms of diphosphorus pentoxide is 1 to 2.5.

10 Claims, 14 Drawing Sheets

U.S. PATENT DOCUMENTS

| | | | |
|---|---|---|---|
| 2002/0012512 A1* | 1/2002 | Elrefaie et al. | 385/125 |
| 2002/0030881 A1* | 3/2002 | Nilsson et al. | 359/341.1 |
| 2002/0197039 A1* | 12/2002 | Carter et al. | 385/127 |
| 2003/0026565 A1* | 2/2003 | Anderson et al. | 385/123 |
| 2003/0031443 A1* | 2/2003 | Soljacic et al. | 385/125 |
| 2003/0142395 A1 | 7/2003 | MacCormack et al. | |
| 2004/0156401 A1 | 8/2004 | Sandrock et al. | |
| 2004/0156606 A1* | 8/2004 | Po | 385/123 |
| 2005/0213908 A1* | 9/2005 | Dragic | 385/124 |
| 2006/0198590 A1* | 9/2006 | Farroni et al. | 385/126 |
| 2011/0026106 A1* | 2/2011 | Nakaguma et al. | 359/341.1 |

FOREIGN PATENT DOCUMENTS

| | | |
|---|---|---|
| JP | 09-194225 A | 7/1997 |
| JP | 09-194225 A | 7/1997 |
| JP | 11-112070 A | 4/1999 |
| JP | 11-112070 A | 4/1999 |
| JP | 2002-043660 A | 2/2002 |
| JP | 2002-043660 A | 2/2002 |
| JP | 2003-124547 A | 4/2003 |
| JP | 2003-124547 A | 4/2003 |
| JP | 2006-519495 A | 8/2006 |
| JP | 2006-519495 A | 8/2006 |
| JP | 2007-114335 A | 5/2007 |
| JP | 2007-114335 A | 5/2007 |
| JP | 2009-006136 A | 1/2009 |
| JP | 2009-052756 A | 3/2009 |
| WO | 2008/061530 A1 | 5/2008 |
| WO | PCT/JP2009/052756 | 2/2009 |
| WO | PCT/JP2009/006136 | 11/2009 |

OTHER PUBLICATIONS

Simo Tammela, et al., "The Potential of Direct Nanoparticle Deposition for the Next Generation of Optical Fibers," the Proceedings of SPIE Photonics West 2006, 9 pages, vol. 6616-16.

T. Kitabayashi, et al., "Population Inversion Factor Dependence of Photodarkening of Yb-doped Fibers and its Suppression by Highly Aluminum Doping," the Proceedings of OFC 2006, 3 pages, OThC5.

M. Engholm, et al., "Preventing photodarkening in ytterbium-doped high power fiber lasers; correlation to the UV-transparency of the core glass," the Proceedings of Optics Express, 2008, pp. 1260-1268, vol. 16, No. 2.

D.J. DiGiovanni, et al., "Structure and Properties of Silica Containing Aluminum and Phosphorus Near the $AlPO_4$ Join," Journal of Non-Crystalline Solids, 1989, pp. 58-64, vol. 113, Issue 1.

D.J. DiGiovanni, et al., "Structure and Properties of Silica Containing Aluminum and Phosphoris Near the AlPO4 Join," Journal of Non-Crystalline Solids, 1989, pp. 58-64, vol. 113.

Ming-Jun Li, et al., "Effective Area Limit for Large Mode Area Laser Fibers," the Proceedings of OFC 2008, 2008, 3 pages, OTuJ2.

Simo Tammela, et al., "The Potential of Direct Nanoparticle Depsition for the Next Generation of Optical Fibers," the Proceedings of SPIE Photonics West 2006, 9 pages, vol. 6616-16.

Office Action issued by the Japanese Patent Office in Japanese Application No. 2010-522121 dated May 29, 2012.

* cited by examiner

YTTERBIUM-DOPED OPTICAL FIBER, FIBER LASER, AND FIBER AMPLIFIER

CROSS-REFERENCE TO RELATED APPLICATION

This application is a continuation application based on a PCT Patent Application No. PCT/JP2009/006136, filed Nov. 16, 2009, whose priority is claimed on Japanese Patent Application No. 2008-292013, filed Nov. 14, 2008, the entire content of which are hereby incorporated by reference.

BACKGROUND OF THE INVENTION

The present invention relates to an ytterbium-doped optical fiber in which photodarkening is suppressed, and a fiber laser and a fiber amplifier respectively having the optical fiber.

BACKGROUND ART

Within an optical fiber having a rare earth element doped thereto, if pumping light is incident to this rare earth doped fiber, a population inversion is formed in the fiber. As a result, stimulated emission light of a wavelength corresponding to the wavelength of this pumping light is generated. Consequently, rare earth doped optical fiber of this type is widely used in fiber amplifiers which amplify signal light of a wavelength the same as that of stimulated emission light, and in fiber lasers which output laser-oscillated light of a wavelength the same as that of stimulated emission light. There is a demand for fiber amplifiers and fiber lasers to have a high-output power and flat gain characteristic in an oscillating or amplifying, in a wider wavelength band. From this view point, research and development of rare earth doped optical fibers is evolving.

An ytterbium (Yb)-doped optical fiber is known as an example of a rare earth doped optical fiber. With this Yb-doped optical fiber, high output power light having a high beam quality can be obtained. The oscillating wavelength of this output light is in the vicinity of 1 μm, substantially the same as that of a Nd—YAG, which is one of the existing high output power lasers. Consequently, using the fiber, realizing a laser medium with a high-output power light source for material processing purposes such as welding, marking, and cutting is anticipated.

FIG. 13 is a drawing showing an example of cross-section of a conventional Yb-doped optical fiber and the refractive index profile thereof, the cross-section being parallel to the radial direction.

The Yb-doped optical fiber 110 shown here is a single cladding fiber, in which a cladding 112 is arranged on the outer periphery of a core 111, and a protective coating layer 113 is arranged on the outer periphery of this cladding 112. In the Yb-doped optical fiber 110, the refractive index of the core 111 is higher than that of the cladding 112 in order to confine guided light. In order to increase the refractive index of the core 111, normally, a refractive index-enhancing dopant such as germanium (Ge), aluminum (Al), and phosphorus (P) is doped to the core 111. Furthermore, Yb, which serves as a dopant having an optical amplifying function, is doped to the core 111. Normally, Yb is doped to the core 111 to give a substantially uniform concentration distribution. However, it may have a non-uniform concentration distribution of Yb, and furthermore, it may be doped to a part of the cladding 112.

By inputting pumping light into this type of Yb-doped optical fiber and irradiating signal light, or by forming a cavity using fiber Bragg gratings, it is possible to obtain high power signal light.

Normally, in those cases where a Yb-doped optical fiber is used as an optical amplification medium of a fiber laser or a fiber amplifier, in order to take full advantage of the fiber type optical amplification medium which enables restricted mode excitation and has a high cooling efficiency, the Yb-doped optical fiber is often used practically under a single-mode operation.

The condition of an optical waveguide for practically operating single-mode propagation is determined by conditions such as the refractive index and diameter of the core (in other words, the refractive index profile in the radial direction of the core), and winding diameter. At this time, the relative refractive index difference of the core needs to be low, or the core diameter needs to be small. Non-Patent Document 1 discloses a detailed description concerning the conditions of an optical waveguide for single-mode propagation. Also, Non-Patent Document 1 discloses the relationship between numerical aperture (NA) and core diameter which should satisfy single-mode propagation. For example, in a case where the core diameter is 20 μm, NA needs to be approximately 0.04 or lower. There is relationship between NA and refractive index of the core which is expressed approximately in the following equation (1).

$$NA = n_1 \sqrt{2\Delta} \qquad (1)$$

According to this equation (1), in a case where the core diameter is 20 μm, the relative refractive index difference needs to be 0.035% or lower. Moreover, in a case where the core diameter is 10 μm, the relative refractive index difference needs to be 0.15% or lower.

Meanwhile, it is desired that an amplification optical fiber is to be capable of performing higher power light output when the amplification optical fiber serves as an optical amplification medium. That is to say, the requirement for a superior amplification optical fiber is that it is capable of propagating high powered light through an optical fiber. However, when comparing cases where same power of light is input into an optical fiber of a small core diameter and where it is input into an optical fiber of a large core diameter, the former has an optical transmission cross-sectional area (mode field diameter) smaller than that of the latter, and accordingly, the power density of the light propagated through the core becomes higher in the former case. As a result, it is likely to induce damage in the core glass or a nonlinear optical phenomenon. Alternatively, amplification power becomes restricted. Therefore, from this point of view, a greater core diameter is preferred. Accordingly, in order to have a greater core diameter and operate single-mode propagation, it is necessary to make the refractive index of the core lower.

One of the factors which degrade the characteristic of a fiber amplifier and a fiber laser is increased loss in the optical fiber (photodarkening) caused by pumping light or signal light propagated through the fiber (refer to Non-Patent Documents 2 and 3). This increased loss causes the gradually degradation of the optical amplification efficiency of the rare earth-doped optical fiber, which is an optical amplification medium, over time. As a result, output of the fiber amplifier and fiber laser becomes lower over time, and the lifetime thereof becomes shorter.

Heretofore, there have been disclosed various types of methods for suppressing photodarkening.

For example, Non-Patent Document 2 discloses that photodarkening is suppressed by applying a special manufacturing method called DND (direct nanoparticle deposition).

Moreover, Non-Patent Document 3 discloses that photodarkening is suppressed by doping aluminum to an optical fiber so that the concentration of aluminum in the optical fiber is high.

Also, Non-Patent Document 4 discloses that photodarkening is suppressed by doping phosphorus so that the concentration of phosphorus is high when manufacturing an optical fiber.

Moreover, Patent Document 1 discloses that photodarkening is suppressed by doping hydrogen to an optical fiber.

Patent Document 2 discloses that by doping a rare earth element, germanium, aluminum, and phosphorus to an optical fiber core, the relative refractive index difference between the core and the cladding becomes small and recrystallization is suppressed.

CITATION LIST

Patent Documents

Patent Document 1: Japanese Unexamined Patent Application, First Publication No. 2007-114335
Patent Document 2: Japanese Unexamined Patent Application, First Publication No. H11-112070

Non-Patent Documents

Non-Patent Document 1: Ming-Jun. Li, et. al., Effective Area Limit for Large Mode Area Laser Fibers, The Proceedings of OFC 2008, OTuJ2 (2008)
Non-Patent Document 2: S. Tammela et al., The Potential of Direct Nanoparticle Deposition for the Next Generation of Optical Fibers, The Proceeding of SPIE Photonics West 2006, Vol. 6116-16 (2006)
Non-Patent Document 3: T. Kitabayashi et. al., Population Inversion Factor Dependence of Photodarkening of Yb-doped Fibers and its Suppression by Highly Aluminum Doping, The Proceedings of OFC 2006, OThC5 (2006)
Non-Patent Document 4: M. Engholm et. al., Preventing photodarkening in ytterbium-doped high power fiber laser; correlation to the UV-transparency of the core glass, The Proceeding of Optics Express Vol. 16, 1260-1268 (2008)

SUMMARY OF THE INVENTION

Problems to be Solved by the Invention

However, according to the method disclosed in Non-Patent Document 2 photodarkening can be suppressed compared to those cases where manufacturing is conducted in the conventional method, although the suppressed level thereof is still insufficient. Moreover, the manufacturing method is special, and in principle, dehydration process cannot be sufficiently conducted in this method. As a result, OH radicals are presented in the optical fiber at a higher level compared to conventional manufacturing methods such as the MCVD method and VAD method. Consequently, in the optical fiber fabricated in this manufacturing method, loss caused by these OH radicals becomes significantly high. Furthermore, the size of a fiber preform used in manufacturing is limited, and consequently the manufacturing cost rises. Therefore, it is not possible to inexpensively manufacture an optical amplification optical fiber with suppressed photodarkening by the method.

In the method disclosed in Non-Patent Document 3, a large amount of aluminum needs to be doped in order to sufficiently suppress photodarkening. As a result, the refractive index of the optical fiber core becomes high. A rare earth-doped optical fiber used in a fiber type optical amplifier and fiber laser is generally used under the condition of single-mode propagation or small number of mode propagation. Therefore, in a case where the refractive index of the core is high, the core diameter needs to be relatively small. A small core diameter means that the effective core cross-sectional area of the optical fiber ($A_{eff}$) is small, and accordingly, the power density of propagated light becomes high and consequently a nonlinear optical effect is likely to occur. That is to say, there is a problem in that the nonlinear optical effect causes wavelength conversion to occur, and the required output light cannot be obtained.

In the method disclosed in Non-Patent Document 4, a large amount of phosphorus needs to be doped in order to sufficiently suppress photodarkening. Also in this case, the refractive index of the optical fiber core becomes high as with the method disclosed in Non-Patent Document 3. In such a case where the core refractive index is high, the core diameter needs to be made small in order to make the optical fiber operate in the single-mode. However, there is a problem in that a nonlinear optical effect is likely to occur as described above, and the required output light cannot be obtained.

According to the method disclosed in Patent Document 1, photodarkening can be suppressed. However, a hydrogen impregnation process and a light irradiation process are required. Consequently, the manufacturing processes become cumbersome, and it is difficult to manufacture a large quantity of optical fibers.

Patent Document 2 does not include a disclosure related to photodarkening suppression. If only doping of the above elements within the concentration range disclosed in Patent Document 2 is made to the core, not only photodarkening may not be sufficiently suppressed in some cases, but also the core refractive index becomes high and the effective core cross-sectional area ($A_{eff}$) of the optical fiber becomes small, and consequently, wavelength conversion due to the nonlinear optical effect may occur and the required output light may not be obtained in some cases.

The present invention takes into consideration the above circumstances, with an object of providing an optical fiber which can be manufactured using a conventional method and in which photodarkening is suppressed.

Means for Solving the Problem

In order to solve the above problems and achieve the above object, the present invention employs the followings.

(1) An ytterbium-doped optical fiber of the present invention includes: a core which contains ytterbium, aluminum, and phosphorus and does not contain germanium; and a cladding which surrounds this core. The ytterbium concentration in the core in terms of ytterbium oxide is 0.09 to 0.68 mole percent. A molar ratio between the phosphorus concentration in the core in terms of diphosphorus pentoxide and the above ytterbium concentration in terms of ytterbium oxide is 3 to 30. A molar ratio between the aluminum concentration in the core in terms of aluminum oxide and the above ytterbium concentration in terms of ytterbium oxide is 3 to 32. A molar ratio between the above aluminum concentration in terms of aluminum oxide and the above phosphorus concentration in terms of diphosphorus pentoxide is 1 to 2.5.

(2) Furthermore, an ytterbium-doped optical fiber of the present invention includes: a core which contains ytterbium, aluminum, phosphorus, and germanium; and a cladding which surrounds the core. The ytterbium concentration in the core in terms of ytterbium oxide is 0.09 to 0.68 mole percent.

The germanium concentration in the core in terms of germanium oxide is 0.1 to 1.1 mole percent. A molar ratio between the phosphorus concentration in the core in terms of diphosphorus pentoxide and the above ytterbium concentration in terms of ytterbium oxide is 3 to 30. A molar ratio between the aluminum concentration in the core in terms of aluminum oxide and the above ytterbium concentration in terms of ytterbium oxide is 3 to 32. A molar ratio between the above aluminum concentration in terms of aluminum oxide and the above phosphorus concentration in terms of diphosphorus pentoxide is 1 to 2.5.

(3) In the case of (2) above, the germanium concentration in terms of germanium oxide is preferably 0.30 to 0.59 mole percent.

(4) In the case of either (1) or (2) above, the core and the cladding are preferably composed of silica glass.

(5) In the case of either (1) or (2) above, it is preferable that the molar ratio between the phosphorus concentration in terms of diphosphorus pentoxide and the ytterbium concentration in terms of ytterbium oxide be 5 to 30, and the molar ratio between the aluminum concentration in terms of aluminum oxide and the ytterbium concentration in terms of ytterbium oxide be 5 to 32.

(6) In the case of either (1) or (2) above, it is preferable that both of the aluminum concentration in terms of aluminum oxide and the phosphorus concentration in terms of diphosphorus pentoxide be 8 mole percent or lower.

(7) In the case of either (1) or (2) above, a relative refractive index difference between the core and the cladding is preferably 0.05 to 0.3%.

(8) In the case of (7) above, the relative refractive index difference between the core and the cladding is preferably 0.1 to 0.25%.

(9) In the case of either (1) or (2) above, it is preferable that the core further contains fluorine and/or boron.

(10) In the case of either (1) or (2) above, it is preferable that the core further contains at least one type selected from the group consisting of a rare earth element other than ytterbium and a transition metal element.

(11) In the case of either (1) or (2) above, it is preferable that at least two layers of the cladding are provided, and a refractive index of a radially inner side cladding is higher than that of the outer side cladding.

(12) In the case of either (1) or (2) above, it is preferable that at least three layers of the cladding are provided, and a refractive index nc1 of a radially innermost side cladding, a refractive index nc3 of an outermost side cladding, and a refractive index nc2 of an intermediate cladding between the innermost side cladding and the outermost side cladding, satisfy a relationship nc1>nc2>nc3.

(13) A fiber laser of the present invention has the ytterbium-doped optical fiber according to either one of (1) and (2) as an optical amplification medium.

(14) A fiber amplifier of the present invention includes the ytterbium-doped optical fiber according to either one of (1) and (2) as an optical amplification medium.

Effect of the Invention

According the ytterbium-doped optical fiber according to either one of (1) and (2), it is possible to inexpensively provide a large quantity of an optical fiber in which photodarkening is suppressed and a superior optical amplification can be obtained. Moreover, by using this type of optical fiber as an optical amplification medium, it is possible to inexpensively provide a fiber laser and a fiber amplifier in which a reduction in output power, which emerges over time, can be suppressed, and the optical characteristic thereof is superior.

MODE FOR CARRYING OUT THE INVENTION

Figure 1:
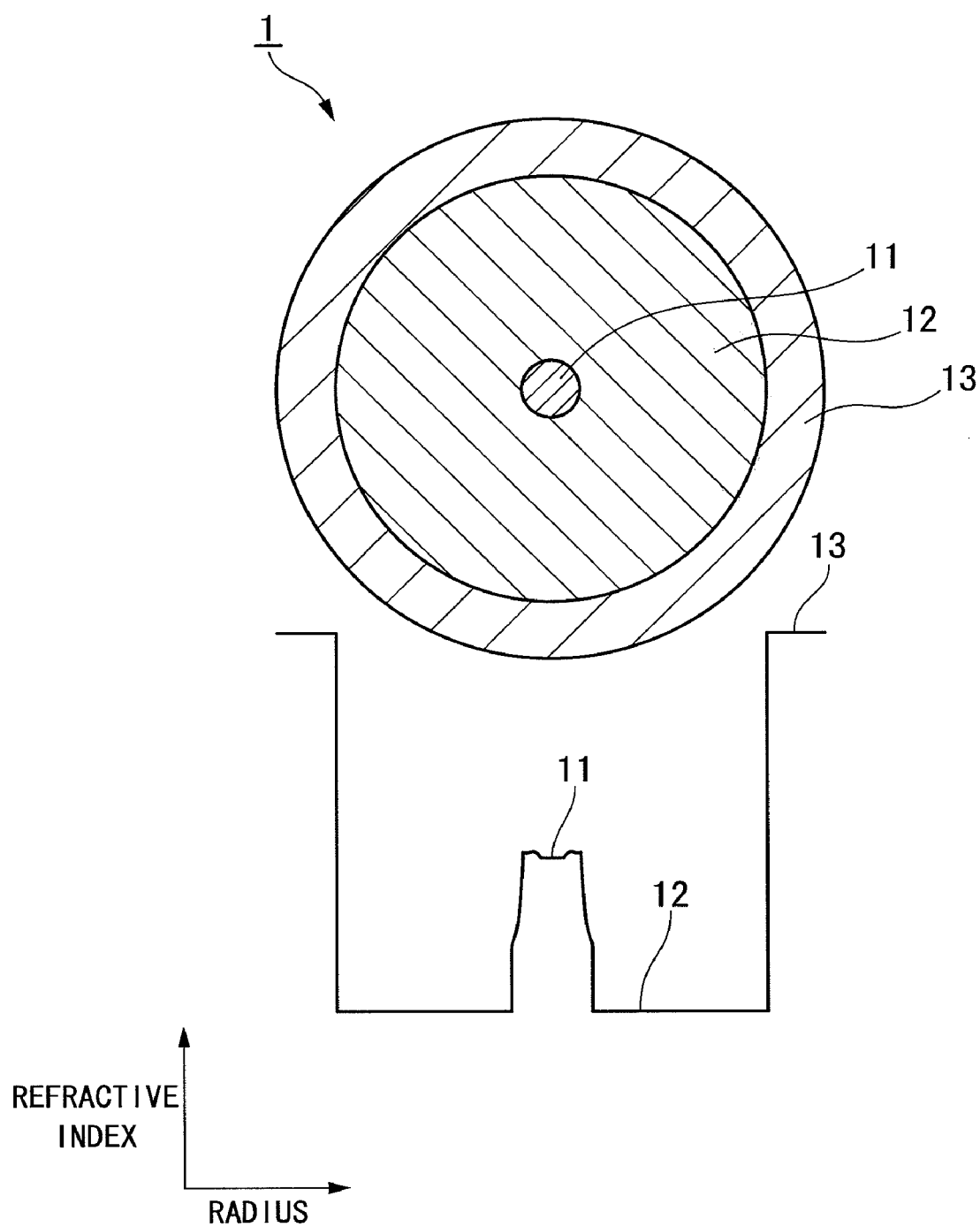
FIG. 1 is a diagram showing a cross-section taken parallel to the radial direction and a refractive index profile of a Yb-doped optical fiber fabricated in Example 1.

Hereunder, the present invention is described in detail.

In the following description, the concentrations of doping elements expressed in units of "mole percent" are average values in optical fibers having a refractive index profile, unless otherwise stated.

<Yb-Doped Optical Fiber>

A Yb-doped optical fiber of the present invention includes a core and a cladding which surrounds this core. The core at least contains Yb, Al, and P. The Yb concentration in the core in terms of ytterbium oxide ($Yb_2O_3$) (hereunder, this may be abbreviated as "$Yb_2O_3$-equivalent concentration"), the P concentration in the core in terms of diphosphorus pentoxide ($P_2O_5$) (hereunder, this may be abbreviated as "$P_2O_5$-equivalent concentration"), and the Al concentration in the core in terms of aluminum oxide ($Al_2O_3$) (hereunder, this may be abbreviated as "$Al_2O_3$-equivalent concentration") satisfy the following conditions.

(A) The $Yb_2O_3$-equivalent concentration is 0.09 to 0.68 mole percent.

(B) The molar ratio between the $P_2O_5$-equivalent concentration and the $Yb_2O_3$-equivalent concentration ($P_2O_5$-equivalent concentration (mole percent)/$Yb_2O_3$-equivalent concentration (mole percent)) is 3 to 30.

(C) The molar ratio between the $Al_2O_3$-equivalent concentration and the $Yb_2O_3$-equivalent concentration ($Al_2O_3$-equivalent concentration (mole percent)/$Yb_2O_3$-equivalent concentration (mole percent)) is 3 to 32.

(D) The molar ratio between the $Al_2O_3$-equivalent concentration and the $P_2O_5$-equivalent concentration ($Al_2O_3$-equivalent concentration (mole percent)/$P_2O_5$-equivalent concentration (mole percent)) is 1 to 2.5.

Yb is a dopant which has an optical amplifying function. Al is a dopant which has a function of increasing the refractive index and a function of preventing glass crystallization. P is a dopant which has a function of suppressing photodarkening and a function of increasing the refractive index.

P in the core has a function of suppressing photodarkening. However, in an optical fiber with a core containing only Yb and P, the glass becomes crystallized in a case where the refractive index of the core has a required low value. Therefore, this type of optical fiber cannot be used as an amplification optical fiber. However, with the core further containing Al, crystallization of the glass can be suppressed while suppressing photodarkening even if the core refractive index has a required low value. Al has the function of suppressing glass crystallization. The reason for this is presumed to be that Al disperses Yb and P in glass. It is also particularly worth noting that containing both Al and P co-existently has an effect of reducing the refractive index.

In the present invention, the $Yb_2O_3$-equivalent concentration, the $P_2O_5$-equivalent concentration, and the $Al_2O_3$-equivalent concentration are respectively set within a predetermined range so that the conditions (A) to (D) are met, and thereby photodarkening suppression and glass crystallization suppression can be both achieved at a high level while an even more superior optical amplification can be obtained.

From the above point of view, in the present invention, the $Yb_2O_3$-equivalent concentration is 0.09 to 0.68 mole percent. If it is 0.09 mole percent or higher, a sufficient optical amplification can be obtained. Specifically, in those cases where the Yb-doped optical fiber is applied to a fiber amplifier or a fiber laser, a superior amplification with approximately 10 dB or higher gain can be obtained. Moreover, if it is 0.68 mole percent or lower, the core refractive index can be suppressed within an allowable range, and the relative refractive index difference ($\Delta$) between the core and the cladding can be made 0.3% or lower.

The molar ratio between the $P_2O_5$-equivalent concentration and the $Yb_2O_3$-equivalent concentration is 3 to 30, and more preferably 5 to 30. If it is greater than or equal to the lower limit value, it is possible to obtain the photodarkening suppression effect at an even higher level, and for example, loss increase due to photodarkening can be suppressed to 0.01 dB or lower. Moreover, if it is less than or equal to the upper limit value, the core relative refractive index difference ($\Delta$) can be made 0.3% or lower, the optical loss can accordingly be made 50 dB/km or lower, and thus a Yb-doped optical fiber having a superior characteristic can be obtained. In particular, with the molar ratio 5 to 30, it is possible to obtain the effect of preventing glass crystallization at an even higher level, thereby facilitating fabrication of fibers.

The molar ratio between the $Al_2O_3$-equivalent concentration and the $Yb_2O_3$-equivalent concentration is 3 to 32, and more preferably 5 to 32. If it is greater than or equal to the lower limit value, even with the low core refractive index, it is possible to obtain the effect of preventing glass crystallization at an even higher level. Moreover, if it is less than or equal to the upper limit value, it is possible to obtain an effect similar to that in the case where the molar ratio between the $P_2O_5$-equivalent concentration and the $Yb_2O_3$-equivalent concentration is less than or equal to the upper limit value. In particular, with the molar ratio 5 to 32, it is possible to obtain the effect of suppressing glass crystallization at an even higher level, thereby facilitating fabrication of fibers.

The molar ratio between the $Al_2O_3$-equivalent concentration and the $P_2O_5$-equivalent concentration is 1 to 2.5, and more preferably 1 to 1.8. If it is greater than or equal to the lower limit value, it is possible to obtain the effect of suppressing cracks caused by glass strain and preventing glass crystallization at an even higher level, and the Yb-doped optical fiber can be stably manufactured.

Moreover, if it is less than or equal to the upper limit value, the core relative refractive index difference ($\Delta$) can be made 0.3% or lower, and a Yb-doped optical fiber having a superior characteristic can be obtained.

The $Al_2O_3$-equivalent concentration in the core is preferably 8 mole percent or lower. Transmission loss in the optical fiber becomes high if the Al content becomes high, however, if it is within this range, transmission loss is enough low, and the optical amplification can be obtained at an even higher level. Specifically, optical loss can be 50 dB/km or lower, for example.

For a similar reason, the $P_2O_5$-equivalent concentration in the core is preferably 8 mole percent or lower.

In the present invention, both of the $Al_2O_3$-equivalent concentration and the $P_2O_5$-equivalent concentration are preferably 8 mole percent or lower.

The relative refractive index difference ($\Delta$) between the core and the cladding is preferably 0.05 to 0.3%, and more preferably 0.1 to 0.25%. If it is 0.3% or lower, the core diameter does not become too small and the light power density does not become too high, in those cases where the optical fiber is used under a practically single-mode condition. Therefore, a significant effect of preventing damage to the core glass which is caused by light and suppressing an optical nonlinear phenomenon can be obtained. Thus, high output power light can be easily obtained. Moreover, if it is 0.25% or lower, it is possible to obtain light of an even higher output power. In contrast, if it is 0.05% or higher, light can be sufficiently confined, and it is possible to suppress an increase in bending loss, which is caused by bending or lateral pressure. As a result, light can be more stably guided.

In the present invention, "relative refractive index difference between core and cladding (%)" refers to a value calculated using: $(n_1-n_0)/n_1 \times 100$ (%), where the refractive index of the core is $n_1$, and the refractive index of the cladding is $n_0$.

Being "practically single-mode" contains being operated practically in single-mode so as to eliminate higher mode propagation with bending, even if the waveguide has a multi-mode structure.

The core and the cladding are preferably composed of silica glass. Silica glass is a versatile material widely used for conventional transmission optical fibers. In addition, it is capable of reducing transmission loss, and is advantageous for amplifying light at high efficiency.

In addition to Yb, Al, and P, the core may further contain other elements. Containing other elements enables enhancement in functions of the Yb-doped optical fiber, and allows different functions to be added thereto.

For example, with the core containing germanium (hereunder, this may be abbreviated as "Ge"), a fiber Bragg grating can be easily formed in the Yb-doped optical fiber.

Moreover, with a core containing either one or both of fluorine (hereunder, this may be abbreviated as "F") and boron (hereunder, this may be abbreviated as "B"), control of the refractive index profile of the core becomes easy, and it is possible to easily obtain an optical fiber having a required optical characteristic.

Moreover, with a core containing at least one type selected from the group consisting of a rare earth element other than ytterbium and a transition metal element, it is possible to develop a sensitization effect by co-doping, to change the pumping wavelength, and to oscillate at a specific wavelength.

The rare earth element may be a commonly known element used in the conventional Yb-doped optical fiber, and specific examples thereof include erbium (Er), thulium (Tm), yttrium (Y), holmium (Ho), samarium (Sm), praseodymium (Pr), and neodymium (Nd).

The transition metal element may also be appropriately selected from commonly known elements according to the purpose.

The other elements to be contained in the core may be one element, or may be two or more elements. These elements may be doped to the core by means of a commonly known method such as solution method.

The type of the other elements to be contained in the core may be appropriately selected according to the purpose, and the concentration thereof may be appropriately set according to the type of the element.

For example, in a case where Ge is contained, the germanium concentration in terms of germanium dioxide ($GeO_2$) is preferably 0.1 to 1.1 mole percent, and more preferably 0.3 to 0.59 mole percent. The germanium concentration 0.1 to 1.1 mole percent in terms of germanium dioxide ($GeO_2$) corresponds to a Ge concentration 0.035 to 0.37 atomic mole percent in the core. $GeO_2$ doping causes a rise in the refractive index by approximately 0.1% in terms of relative refractive index per 1 mole percent. Therefore, in order to obtain a certain refractive index, which may be required in an optical waveguide design, it is necessary to relatively reduce the doping amount of diphosphorus pentoxide, aluminum oxide, ytterbium oxide, and so forth, which similarly have a function of increasing the refractive index. The present invention uses the refractive index reduction effect due to co-doping diphosphorus pentoxide and aluminum oxide, and consequently, the core refractive index is lowered by reducing aluminum oxide, or by relatively reducing the doping amount of ytterbium oxide. For example, the relative refractive index of the core increases by approximately 0.2% if 2 mole percent of germanium dioxide is doped, and accordingly, fabrication needs to be conducted while the doping amount of either one or both of aluminum oxide and ytterbium oxide are reduced so that the relative refractive index is reduced by approximately 0.2%. If aluminum oxide is reduced, manufacturing of optical fiber products becomes impossible due to glass crystallization. Moreover, if ytterbium oxide is reduced, the optical amplification efficiency is accordingly reduced. Therefore, it is not preferable to reduce the doping amount of these. For example, in a case where an ytterbium-doped fiber is fabricated with such a design that the relative refractive index difference between the core and the cladding is 0.25%, if 2 mole percent of germanium dioxide is doped as described above, the doping amount of aluminum oxide and ytterbium oxide needs to be reduced so that the relative refractive index is reduced by 0.2%. For example, if the relative refractive index is reduced by 0.2% only by reducing the aluminum oxide doping amount, aluminum oxide needs to be reduced by 1.4 mole percent. In this case, crystallization occurs in the glass, and product manufacturing becomes impossible. Moreover, since the concentration (doping amount) of ytterbium oxide is not high originally, a 0.2% reduction in the relative refractive index cannot be made by reducing only ytterbium oxide. For these reasons, doping of a large amount of $GeO_2$ is unfavorable in many cases. In contrast, if the amount of $GeO_2$ doping is low, the doping purpose cannot be sufficiently accomplished. For example, when considering a case of applying fiber Bragg gratings to this fiber, at least 0.1 mole percent of $GeO_2$ is required, and 0.3 mole percent or higher of $GeO_2$ is more favorable. On the other hand, although approximately 1.1 mole percent of $GeO_2$ is sufficient for applying fiber Bragg grating, 0.59 mole percent or lower of $GeO_2$ is more favorable when the negative effect of a large amount of $GeO_2$ described above is taken into consideration.

Furthermore, if 0.6 mole percent of germanium dioxide is doped, the relative refractive index of the core increases by approximately 0.06%. Therefore, fabrication of the optical fiber needs to be conducted while the doping amount of either one or both of aluminum oxide and ytterbium oxide are reduced so that the relative refractive index is reduced by approximately 0.06%. If the aluminum oxide is reduced, product manufacturing becomes impossible due to crystallization of the glass as described above. Moreover, if the ytterbium oxide is reduced, it is not preferable as the optical amplification is accordingly reduced. For example, in a case where an ytterbium-doped fiber is fabricated with such a design that the relative refractive index difference between the core and the cladding is 0.20% and 0.6 mole percent of germanium dioxide is doped, the doping amount of aluminum oxide, and ytterbium oxide needs to be reduced so that the relative refractive index is reduced by 0.06%. For example, if it is reduced by 0.06% only with aluminum oxide, 0.4 mole percent of aluminum oxide needs to be reduced. Also in this case, crystallization occurs in the glass as described above, and consequently product manufacturing becomes impossible. Moreover, in a case where only a reduction in ytterbium oxide is made, since the concentration (doping amount) of ytterbium oxide is not high originally, if the doping amount thereof is reduced so as to reduce the relative refractive index by 0.06%, optical amplification efficiency is reduced and the required output cannot be obtained.

Although Patent Document 2 above discloses an optical fiber having a composition containing germanium dioxide, diphosphorus pentoxide, and aluminum oxide, it includes no disclosures related to photodarkening, which is the main objective of the present invention. Furthermore, the example of Patent Document 2 does not include a disclosure related to the composition ratio where the relative refractive index is 0.29% or lower. Therefore, according to the contents disclosed in Patent Document 2, the core refractive index cannot be sufficiently lowered, and it is accordingly difficult to avoid damage to the core glass and to avoid an optical nonlinear phenomenon, and at the same time to realize single mode propagation.

Based on the above understanding, it is preferable that $GeO_2$ not be doped if possible unless there is a particular purpose for doping $GeO_2$ such as applying fiber Bragg gratings. Because, as described above, while $GeO_2$ doping will not have a particular influence on photodarkening, $GeO_2$ doping will still cause an increase in the refractive index. As a result, power tolerance is reduced. Similarly, it is also preferable that a refractive index-increasing element (such as Ti) other than Al and P not bedoped if possible unless there is a particular effect of doping the element.

Moreover, in a case where B is contained, the boron concentration in terms of boron trioxide ($B_2O_3$) is preferably 0.01 to 5 mole percent, and more preferably 0.05 to 1 mole percent. If it is less than or equal to the upper limit value of the above range, an increase in the residual stress is suppressed, and an optical fiber with sufficient strength can be obtained.

Moreover, in those cases where F is contained, the concentration thereof is preferably 0.05 to 3 mole percent, and more preferably 0.1 to 1 mole percent. If it is less than or equal to the upper limit value of the above range, cost can be reduced.

Furthermore, in those cases where thulium (Tm) is contained as a rare earth element or transition metal element, the thulium concentration in terms of thulium oxide ($Tm_2O_3$) is preferably 0.01 to 1 mole percent, and more preferably 0.05 to 0.5 mole percent. If it is less than or equal to the upper limit value of the above range, it is possible to suppress problems such as concentration quenching.

The cladding may be of a single layer structure, a two-layer structure, a three-layer structure, or a multiple-layer structure.

For example, if it is a multi-cladding fiber such as a double-cladding fiber or a triple-cladding fiber, it is possible to obtain light of a higher output power compared to a single-cladding fiber. In a multi-cladding fiber, by guiding pumping light to the cladding, power density of pumping light in the core can be reduced. Consequently, it is possible to fabricate a fiber laser and a fiber amplifier of an even higher output power which prevents damage to the core glass and suppress an optical nonlinear phenomenon. From such a view point, a triple-cladding fiber, which has a high level of pumping light utilization efficiency, is more preferable compared to a double-cladding fiber.

Moreover, the shape of the cladding is not particularly limited, and it may be appropriately selected according to the purpose. For example, in order to suppress a skew mode, as shown in FIG. 5 and FIG. 7 to FIG. 11 for example, the cross-sectional shape of the cladding is preferably a non-circular shape such as a D-shape, the cross-section being parallel to the radial direction.

Moreover, in the vicinity of the core, a stress applying section may be provided. The stress applying section may be formed from a material in which $B_2O_3$ or the like is doped to silica glass for example.

Figure 13:
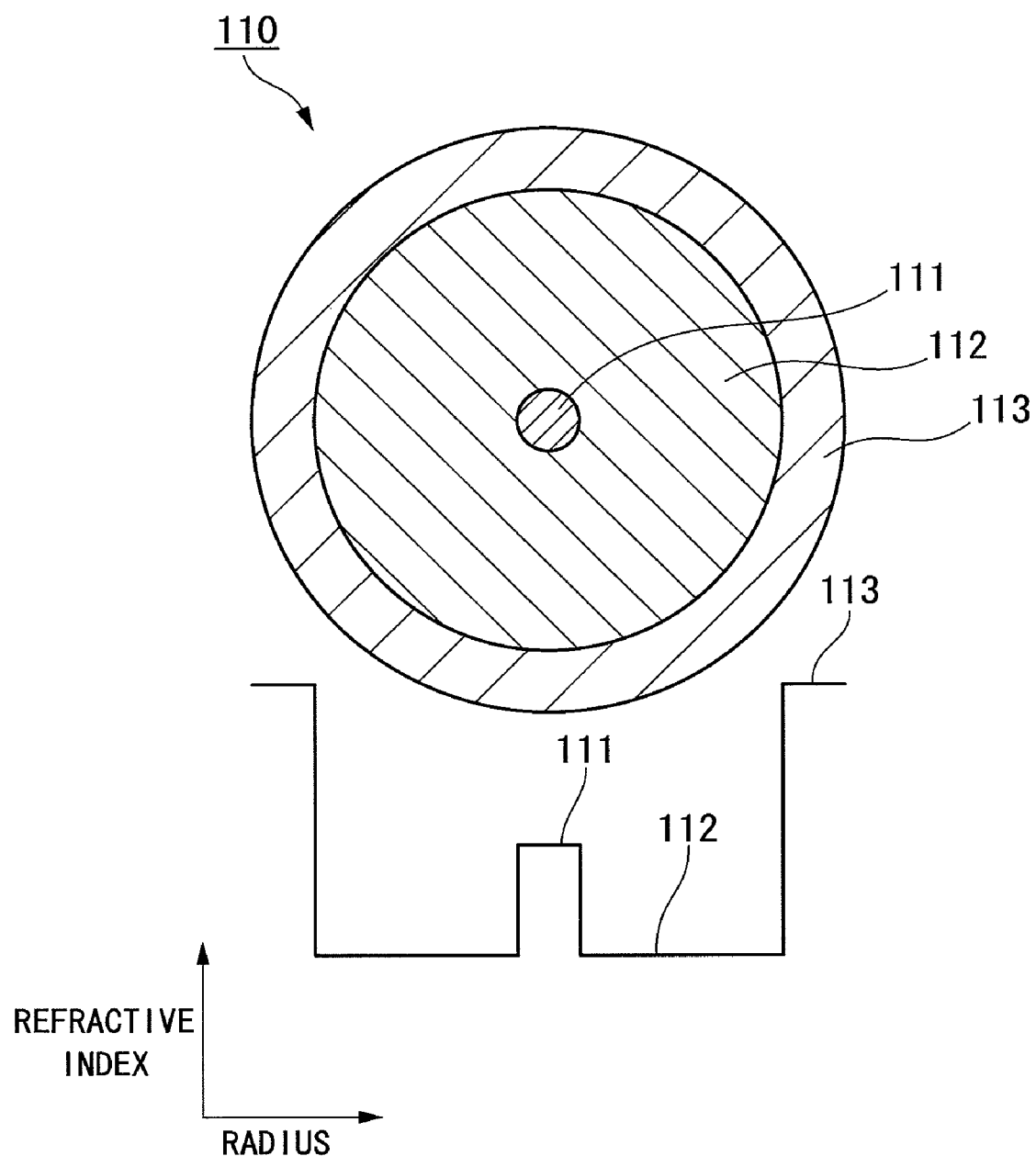
FIG. 13 is a drawing showing a cross-section taken parallel to the radial direction and a refractive index profile of a conventional Yb-doped optical fiber.

The refractive index profile of the core may be appropriately adjusted according to the purpose. For example, it may be of a step profile illustrated as an example in FIG. 13, or it may be of any commonly known refractive index profile type such as a graded type profile, an O-ring type profile, a dual shape profile, a segmented core type profile, a double O-ring type profile, and a W-type profile.

It is preferable that the refractive index of the core and cladding be adjusted in consideration of the structure of the Yb-doped optical fiber and the required relative refractive index difference.

For example, in order to confine light to be guided, the refractive index of the core is preferably higher than that of the cladding.

Moreover, in a case of a multi-cladding fiber having at least with two layers of cladding, the refractive index of the radially inner side cladding is preferably higher than that of the radially outer side cladding. With this type of configuration, it is possible to obtain light of an even higher output power. Here, the terms "radially inner side" and "radially outer side" are used to describe a relative positional relationship in the radial direction between the two layers of cladding.

Therefore, the "radially inner side cladding" and the "radially outer side cladding" here do not always describe only two layers of cladding of a double-cladding fiber, but also describe any two layers of cladding in a multi-cladding fiber having three or more layers of cladding.

Moreover, in a case of a multi-cladding fiber having at least three layers of cladding, it is preferable that the refractive index nc1 of the radially innermost side cladding, the refractive index nc3 of the outermost side cladding, and the refractive index nc2 of the intermediate cladding between the innermost side cladding and the outermost side cladding, satisfy a relationship nc1>nc2>nc3. With this type of configuration, it is possible to efficiently obtain light of an even higher output power.

The "intermediate cladding" here may be any cladding arranged between the innermost side cladding and the outermost side cladding, and, for example, it does not only describe the intermediate cladding between the innermost side cladding and the outermost side cladding in a triple-cladding fiber.

It is preferable that the core diameter be set appropriately according to the core refractive index, however, in general, it is preferably 4 to 50 µm, and more preferably 8 to 43 µm.

The Yb-doped optical fiber may be manufactured by a commonly known method except that a predetermined amount of Yb, Al, and P are doped to the core.

For example, it may be manufactured such that: a fiber preform is fabricated by MCVD method, VAD method, or the like; the preform is drawn so as to have a required outer diameter; and on the outer periphery thereof, a UV curing resin or the like is formed as a protective coating layer. In the fiber preform fabrication process, Yb may be doped by a method of doping it to soot by solution method, or by spraying method.

Moreover, in a case where the shape of the cladding is a non-circular shape, for example, the Yb-doped fiber preform may be externally grinded into a required shape, and then it may be drawn.

Furthermore, for example, in a case of applying a stress applying section in the cladding, forming holes in the central axially direction (longitudinal direction of the fiber preform) to the Yb-doped preform, and preferably grinding and polishing the inner surface thereof into a mirror finished surface, a $B_2O_3$—$SiO_2$ glass-made stress applying section fabricated by the MCVD method may be inserted therethrough, and then it may be drawn.

<Fiber Laser, Fiber Amplifier>

A fiber laser or a fiber amplifier of the present invention has the above Yb-doped optical fiber of the present invention as an optical amplification medium.

Apart from the above Yb-doped optical fiber of the present invention being used as an amplification medium, it may be manufactured by a method similar to that of commonly known fiber lasers and fiber amplifiers.

According to the present invention, with application of a commonly known method such as MCVD method or VAD method, it is possible to manufacture a Yb-doped optical fiber with a superior photodarkening suppression effect such that high output power light can be obtained. Moreover, the size of the fiber preform used in manufacturing is not limited. Therefore, it is possible to inexpensively provide a large quantity of Yb-doped optical fibers having the above superior characteristics.

Moreover, by using this type of optical fiber as an optical amplification medium, it is possible to inexpensively provide a fiber laser and a fiber amplifier in which a reduction in output power, which emerges over time, can be suppressed, and the optical characteristics thereof are superior.

EXAMPLE

Hereunder, the present invention is further described in detail, with reference to specific examples. However, the present invention is not limited in any way by the following examples.

In the examples below, the amount of increase in loss due to photodarkening of a Yb-doped optical fiber was evaluated by the following method. As a result, it is possible to relatively compare the amount of increase in loss even between optical fibers with different applications and structures.

(Method of Evaluating the Amount of Increase in Loss Due to Photodarkening)

An Yb-doped optical fiber of such a length that the Yb absorption of the core was 340 dB was used, and pumping light of wavelength of 976 nm was irradiated on the core for a duration of 100 minutes such that the light of 400 mW was input into the core. Then, the difference in losses at wavelength of 800 nm before and after incident was taken as the "amount of increase in loss due to photodarkening".

Example 1

A Yb-doped optical fiber of the structure shown in FIG. 1 was fabricated. FIG. 1 is a drawing showing a cross-section of a Yb-doped optical fiber 1 and the refractive index profile thereof, the cross-section being parallel to the radial direction. The Yb-doped optical fiber 1 is a single-cladding fiber in which a cladding 12 is arranged on the outer periphery of a core 11, and a protective coating layer 13 is arranged on the outer periphery of the cladding 12.

A fiber preform was fabricated by MCVD method. Moreover, Yb was doped by solution method. The fiber preform was drawn until the glass outer diameter became approximately 125 μm, and the protective coating layer was arranged on the outer periphery thereof.

$Yb_2O_3$ in the core was 0.46 mole percent, $P_2O_5/Yb_2O_3$ was 6.61, $Al_2O_3/Yb_2O_3$ was 15.92, and $Al_2O_3/P_2O_5$ was 2.41. Moreover, the relative refractive index difference ($\Delta$) of the core was 0.29%.

Figure 2:
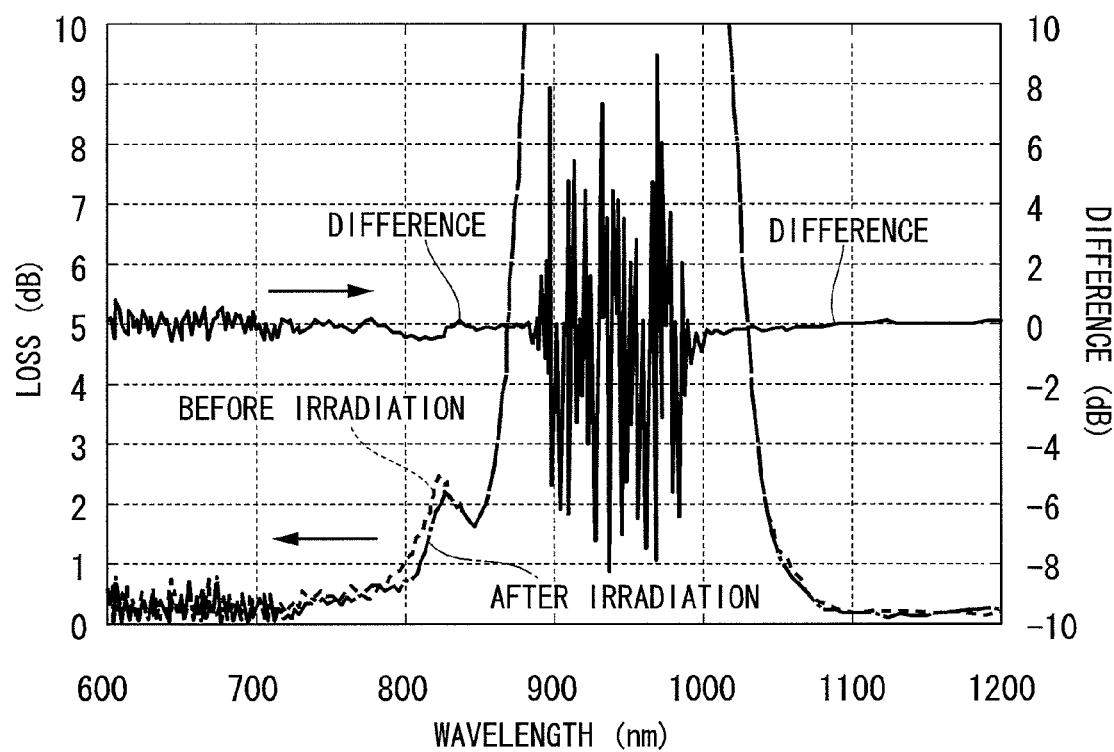
FIG. 2 is a graph showing a relationship between the amount of loss increase and its difference with respect to the wavelength of the difference thereof before and after pumping light irradiation in the fabricated fiber of Example 1.

Almost no increase was found in loss caused by photodarkening in the Yb-doped optical fiber, and the amount of increase in loss found by the above evaluation method was less than 0.01 dB. The relationship between the loss amount before and after pumping light irradiation and the wavelength of the difference thereof at this time is illustrated as a graph in FIG. 2. In FIG. 2, noise is seen in the vicinity of wavelength 1,000 nm in the loss amount data, and this is because an optical absorption band of Yb is present in this wavelength band.

Moreover, a fiber amplifier was fabricated with use of the obtained Yb-doped optical fiber, and changes in the optical output over time were evaluated. As a result, in the fiber amplifier of initial output of 1.5 W, the amount of output reduction after 100-hour operation was less than or equal to 3%. This amount of output reduction included, in addition to an increase in loss in the optical fiber, reductions caused by temperature changes and variations in measurements over time. Therefore, it was thought that the output reduction caused by an increase in loss due to photodarkening was less than or equal to 1%.

The obtained Yb-doped optical fiber and the evaluation results thereof are shown in Table 1.

Example 2

Figure 3:
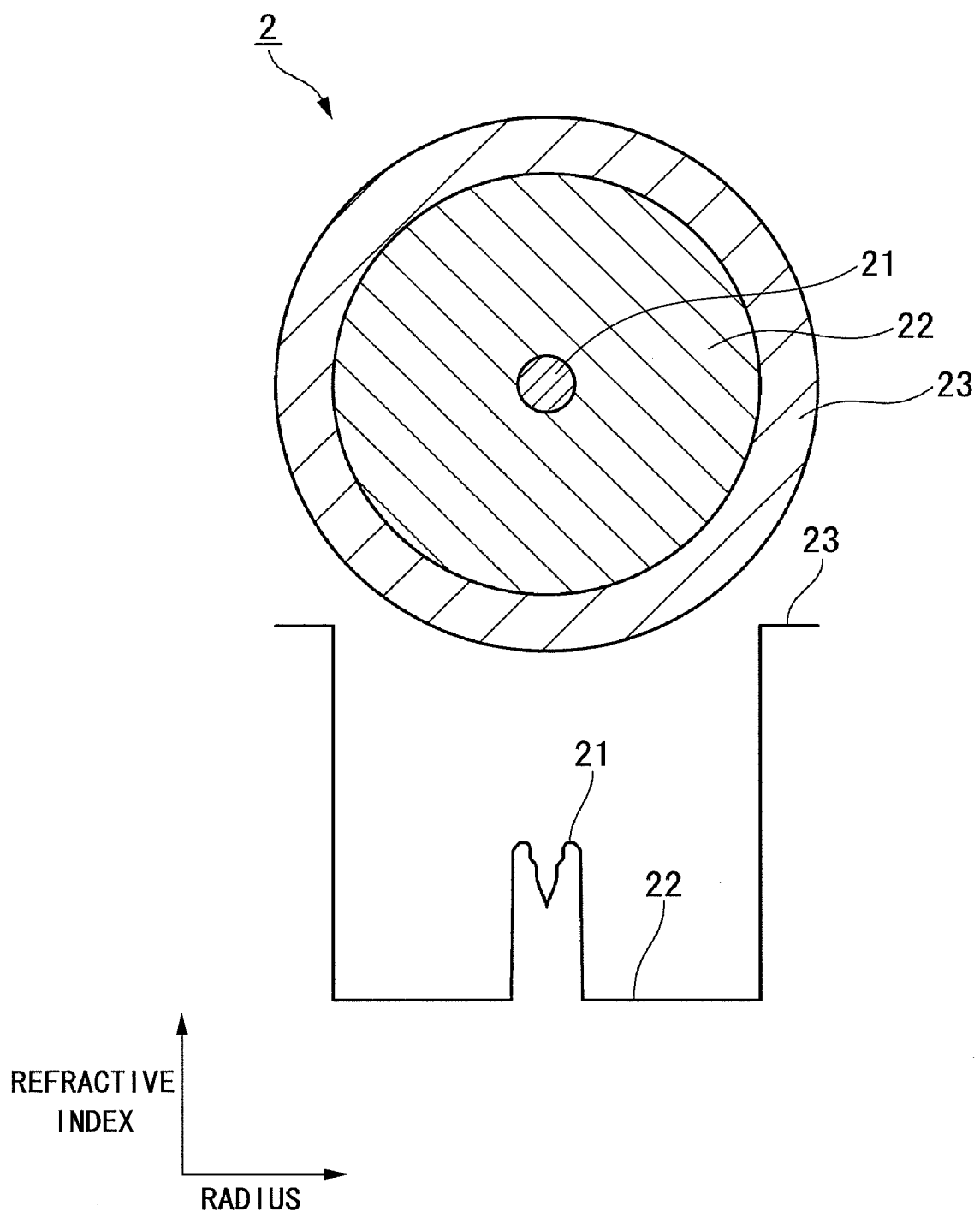
FIG. 3 is a diagram showing a cross-section taken parallel to the radial direction and a refractive index profile of a Yb-doped optical fiber fabricated in Example 2.

A Yb-doped optical fiber of the structure shown in FIG. 3 was fabricated. FIG. 3 is a drawing showing a cross-section of a Yb-doped optical fiber 2 and the refractive index profile thereof, the cross-section being parallel to the radial direction. The Yb-doped optical fiber 2 is a single-cladding fiber in which a cladding 22 is arranged on the outer periphery of a core 21, and a protective coating layer 23 is arranged on the outer periphery of the cladding 22.

A fiber preform was fabricated by VAD method. Moreover, Yb was doped by solution method. The fiber preform was drawn until the glass outer diameter became approximately 125 μm, and the protective coating layer was arranged on the outer periphery thereof.

$Yb_2O_3$ in the core was 0.38 mole percent, $P_2O_5/Yb_2O_3$ was 29.71, $Al_2O_3/Yb_2O_3$ was 31.06, and $Al_2O_3/P_2O_5$ was 1.05. Moreover, the relative refractive index difference ($\Delta$) of the core was 0.14%.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a fiber laser of initial output of 3 W, the amount of output reduction after 100-hour operation was less than or equal to 3%. This amount of output reduction includes, in addition to an increase in loss in the optical fiber, reductions caused by temperature changes and variations in measurements over time. Therefore, it was thought that the output reduction caused by an increase in loss due to photodarkening was less than or equal to 1%.

The obtained Yb-doped optical fiber and the evaluation results thereof are shown in Table 1.

Example 3

Figure 4:
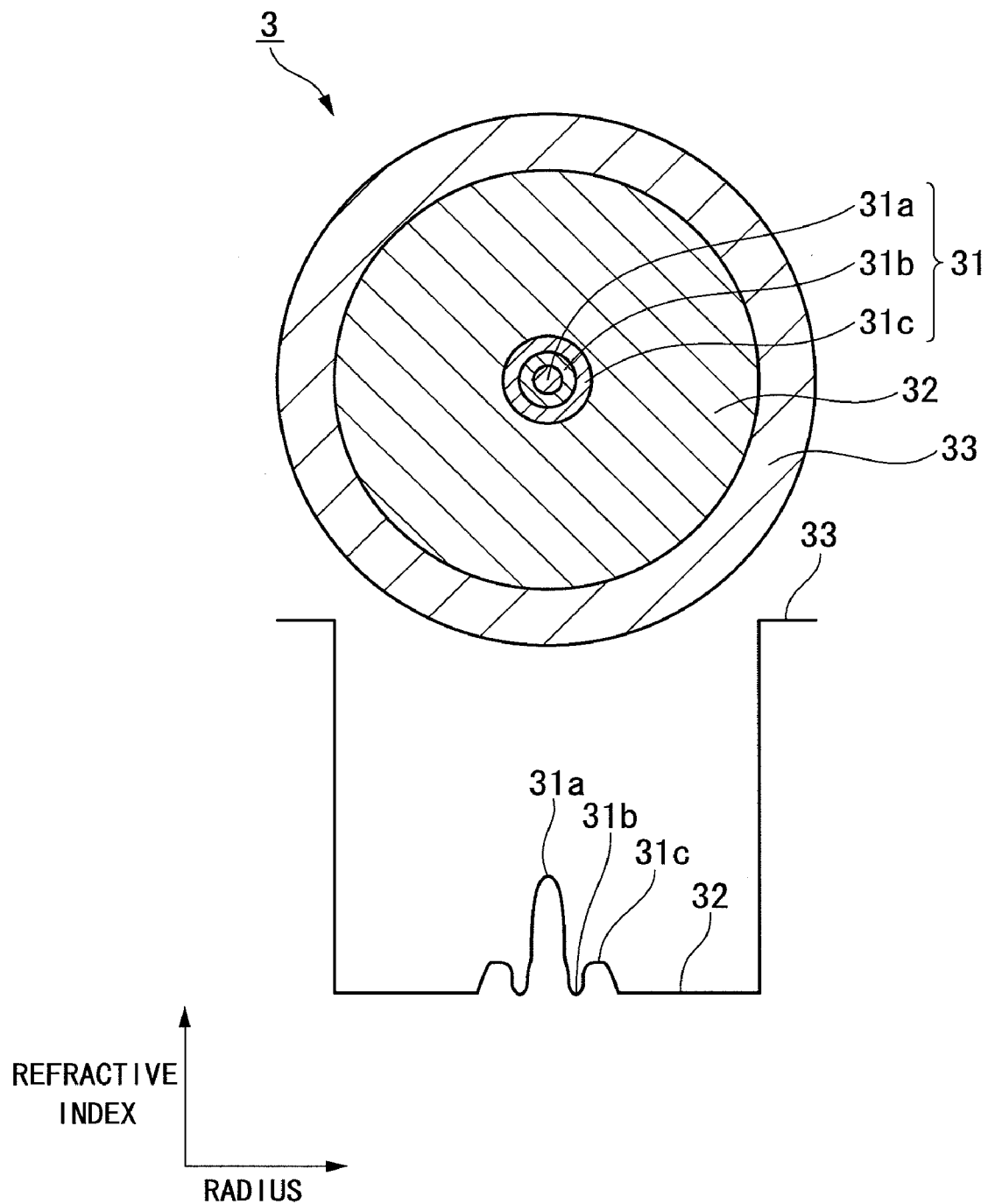
FIG. 4 is a diagram showing a cross-section taken parallel to the radial direction and a refractive index profile of a Yb-doped optical fiber fabricated in Example 3.

A Yb-doped optical fiber of the structure shown in FIG. 4 was fabricated. FIG. 4 is a drawing showing a cross-section of a Yb-doped optical fiber 3 and the refractive index profile thereof, the cross-section being parallel to the radial direction. The Yb-doped optical fiber 3 is a single-cladding fiber having a core 31 of a three-layer structure, in which a cladding 32 is arranged on the outer periphery of a core 31, and a protective coating layer 33 is arranged on the outer periphery of the cladding 32. The core 31 includes a center core 31a, a ring groove 31b arranged on the outer periphery of the center core 31a, and a ring core 31c arranged on the outer periphery of the ring groove 31b.

A fiber preform was fabricated by MCVD method. Moreover, Yb was doped by means of solution method. The fiber preform was drawn until the glass outer diameter became approximately 125 μm, and the protective coating layer was arranged on the outer periphery thereof.

$Yb_2O_3$ in the core was 0.09 mole percent, $P_2O_5/Yb_2O_3$ was 22.33, $Al_2O_3/Yb_2O_3$ was 28.00, and $Al_2O_3/P_2O_5$ was 1.25. Moreover, the relative refractive index difference ($\Delta$) of the core was 0.07%.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a fiber laser of initial output of 4.5 W, the amount of output reduction after 100-hour operation was less than or equal to 4%. This amount of output reduction includes, in addition to an increase in loss in the optical fiber, reductions caused by temperature changes and variations in measurements over time. Therefore, it was thought that the output reduction caused by an increase in loss due to photodarkening was less than or equal to 2%.

The obtained Yb-doped optical fiber and the evaluation results thereof are shown in Table 1.

Example 4

Figure 5:
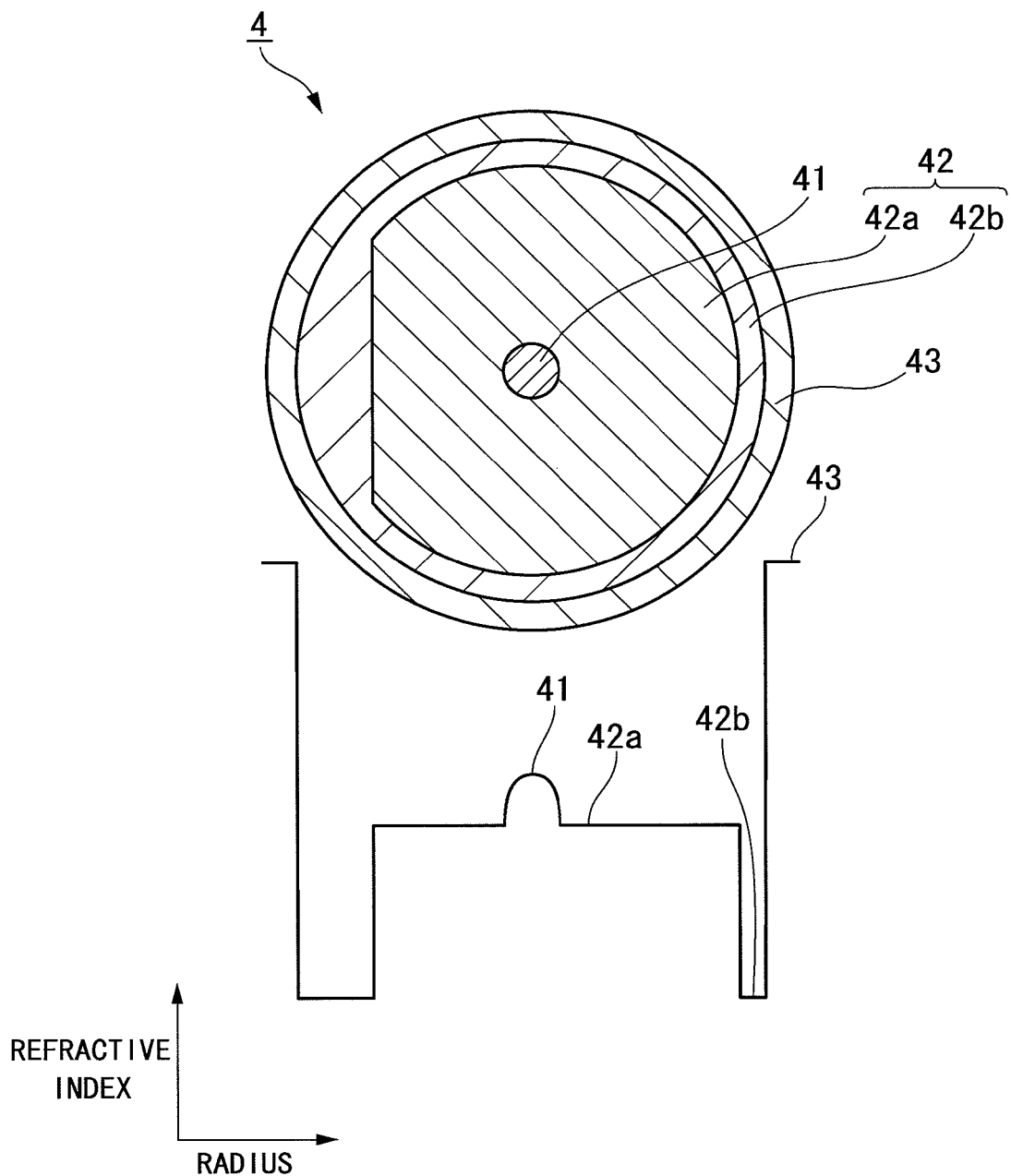
FIG. 5 is a diagram showing a cross-section taken parallel to the radial direction and a refractive index profile of a Yb-doped optical fiber fabricated in Example 4.

A Yb-doped optical fiber of the structure shown in FIG. 5 was fabricated. FIG. 5 is a drawing showing a cross-section of a Yb-doped optical fiber 4 and the refractive index profile thereof, the cross-section being parallel to the radial direction. The Yb-doped optical fiber 4 is a double-cladding fiber having a two-layer structured cladding 42, in which an inner side cladding 42a is arranged on the outer periphery of a core 41, an outer side cladding 42b is arranged on the outer periphery of the inner side cladding 42a, and a protective coating layer 43 is arranged on the outer periphery of the outer side cladding 42b. Moreover, the cross-sectional shape of the inner side cladding 42a is a D shape.

A fiber preform was fabricated by means of MCVD method. Furthermore, Yb was doped during the soot fabrication process by spraying method. At this time, the cylindrical column-shaped fiber preform was externally grinded so that the cross-sectional shape thereof became a D shape as illustrated in FIG. 5. The obtained fiber preform was drawn until the circumcircle diameter of the cross-section of the glass became approximately 400 μm. At this time, a polymer cladding material having a refractive index lower than that of the glass was coated and cured on the outer periphery of the glass, to thereby form a structure where the pumping light is confined in the glass cladding. Furthermore, the outer periphery thereof was coated with a protective UV curing resin.

$Yb_2O_3$ in the core was 0.52 mole percent, $P_2O_5/Yb_2O_3$ was 3.04, $Al_2O_3/Yb_2O_3$ was 3.10, and $Al_2O_3/P_2O_5$ was 1.02. Moreover, the relative refractive index difference (Δ) of the core was 0.24%. Furthermore, the cladding NA obtained from the relative refractive index difference between the glass cladding which guides pumping light and the polymer cladding which confines light, was approximately 0.46.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a pulse-output fiber laser of initial output of 14.8 W, the amount of output reduction after 100-hour operation was less than or equal to 1%. This amount of output reduction includes, in addition to an increase in loss in the optical fiber, reductions caused by temperature changes and variations in measurements. Therefore, it was thought that almost no output reduction was caused by an increase in loss due to photodarkening.

The obtained Yb-doped optical fiber and the evaluation results thereof are shown in Table 1.

Example 5

Figure 6:
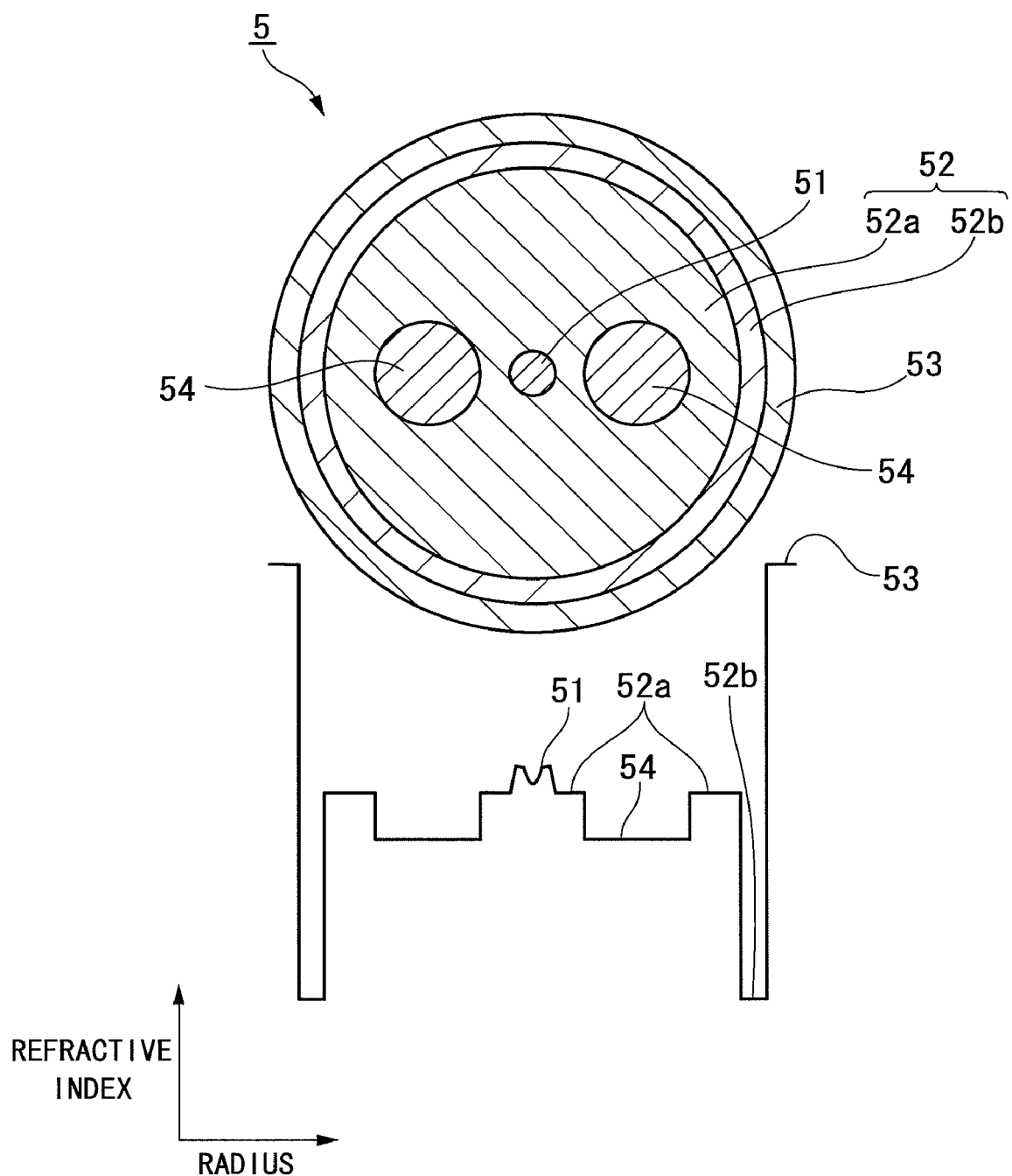
FIG. 6 is a diagram showing a cross-section taken parallel to the radial direction and a refractive index profile of a Yb-doped optical fiber fabricated in Example 5.

A Yb-doped optical fiber of the structure shown in FIG. 6 was fabricated. FIG. 6 is a drawing showing a cross-section of a Yb-doped optical fiber 5 and the refractive index profile thereof, the cross-section being parallel to the radial direction. The Yb-doped optical fiber 5 is a double-cladding fiber having a two-layer structured cladding 52, in which an inner side cladding 52a is arranged on the outer periphery of a core 51, an outer side cladding 52b is arranged on the outer periphery of the inner side cladding 52a, and a protective coating layer 53 is arranged on the outer periphery of the outer side cladding 52b. Moreover, in the inner side cladding 52a, a pair of stress applying sections 54 are arranged in positions symmetric about the core 51.

A fiber preform was fabricated by means of VAD method. Furthermore, Yb was doped during the soot fabrication process by spraying method. In the central axial direction of this fiber preform, a pair of holes were provided so as to be arranged symmetric about the core, a stress applying glass fabricated with boron doped thereto was respectively inserted therethrough, and it was drawn until the outer diameter of the glass became approximately 125 μm. At this time, a polymer cladding material having a refractive index lower than that of the glass was coated and cured on the outer periphery of the glass, to thereby form a structure where the pumping light is confined in the glass cladding. Furthermore, the outer periphery thereof was coated with a protective UV curing resin.

$Yb_2O_3$ in the core was 0.33 mole percent, $P_2O_5/Yb_2O_3$ was 3.02, $Al_2O_3/Yb_2O_3$ was 5.34, and $Al_2O_3/P_2O_5$ was 1.76. Moreover, the relative refractive index difference (Δ) of the core was 0.29%. Furthermore, the cladding NA obtained from the relative refractive index difference between the glass cladding which guides pumping light and the polymer cladding which confines light, was approximately 0.41.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a fiber laser of initial output of 10.8 W, the amount of output reduction after 100-hour operation was less than or equal to 4%. This amount of output reduction includes, in addition to an increase in loss in the optical fiber, reductions caused by temperature changes and variations in measurements. Therefore, it was thought that the output reduction caused by an increase in loss due to photodarkening was less than or equal to 2%.

The obtained Yb-doped optical fiber and the evaluation results thereof are shown in Table 1.

Example 6

Figure 7:
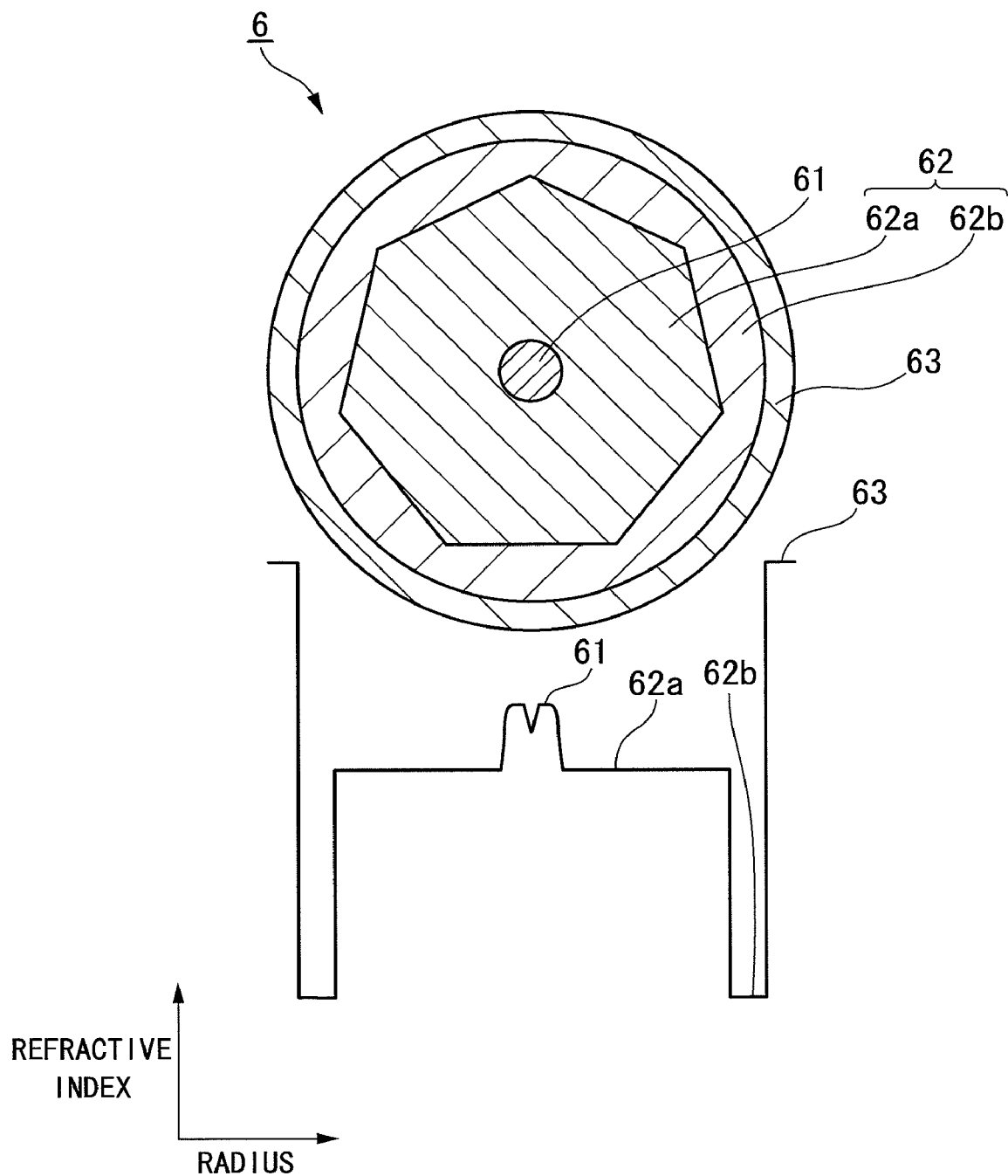
FIG. 7 is a diagram showing a cross-section taken parallel to the radial direction and a refractive index profile of a Yb-doped optical fiber fabricated in Example 6.

A Yb-doped optical fiber of the structure shown in FIG. 7 was fabricated. FIG. 7 is a drawing showing a cross-section of a Yb-doped optical fiber 6 and the refractive index profile thereof, the cross-section being parallel to the radial direction. The Yb-doped optical fiber 6 is a double-cladding fiber having a two-layer structured cladding 62, in which an inner side cladding 62a is arranged on the outer periphery of a core 61, an outer side cladding 62b is arranged on the outer periphery of the inner side cladding 62a, and a protective coating layer 63 is arranged on the outer periphery of the outer side cladding 62b. Moreover, the cross-sectional shape of the inner side cladding 62a is a regular heptagon, and the core 61, the inner side cladding 62a, and the outer side cladding 62b are arranged concentrically.

A fiber preform was fabricated by means of MCVD method. Moreover, Yb was doped by means of solution method. At this time, the cylindrical column-shaped fiber preform was externally grinded so that the cross-sectional shape thereof became a regular heptagon as illustrated in FIG. 7. The obtained fiber preform was drawn until the circumcircle diameter of the cross-section of the glass became approximately 420 μm. At this time, a polymer cladding material having a refractive index lower than that of the glass was coated and cured on the outer periphery of the glass, to thereby form a structure where the pumping light is confined in the glass cladding. Furthermore, the outer periphery thereof was coated with a protective UV curing resin.

$Yb_2O_3$ in the core was 0.39 mole percent, $P_2O_5/Yb_2O_3$ was 11.98, $Al_2O_3/Yb_2O_3$ was 18.34, and $Al_2O_3/P_2O_5$ was 1.53. Moreover, the relative refractive index difference (Δ) of the core was 0.13%. Furthermore, the cladding NA obtained from the relative refractive index difference between the glass cladding which guides pumping light and the polymer cladding which confines light, was approximately 0.46.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a fiber laser of initial output of 122 W, the amount of output reduction after 100-hour operation was less than or equal to 6%. This amount of output reduction includes, in addition to an increase in loss in the optical fiber, reductions caused by temperature changes and variations in measurements. Therefore, it was thought that the output reduction caused by an increase in loss due to photodarkening was less than or equal to 3%.

The obtained Yb-doped optical fiber and the evaluation results thereof are shown in Table 1.

Example 7

Figure 8:
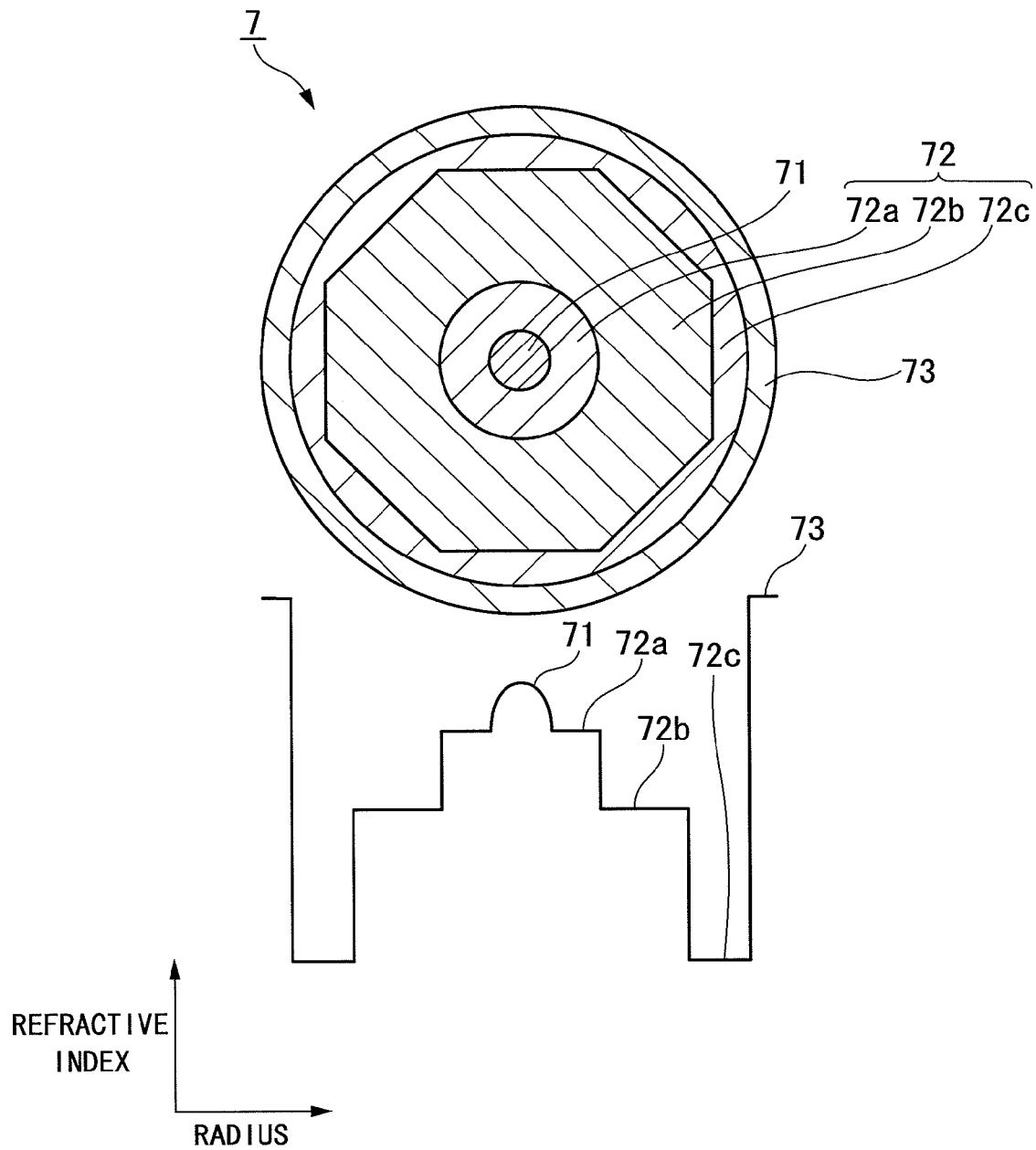
FIG. 8 is a diagram showing a cross-section taken parallel to the radial direction and a refractive index profile of a Yb-doped optical fiber fabricated in Example 7.

A Yb-doped optical fiber of the structure shown in FIG. 8 was fabricated. FIG. 8 is a drawing showing a cross-section of a Yb-doped optical fiber 7 and the refractive index profile thereof, the cross-section being parallel to the radial direction. The Yb-doped optical fiber 7 is a triple-cladding fiber having a three-layer structured cladding 72, in which an innermost side cladding 72a is arranged on the outer periphery of a core 71, an intermediate cladding 72 is arranged on the outer periphery of the innermost side cladding 72a, an outermost side cladding 72c is arranged on the outer periphery of the intermediate cladding 72b, and a protective coating layer 73 is arranged on the outer periphery of the outermost side cladding 72c. Moreover, the cross-sectional shape of the intermediate cladding 72b is a regular octagon, and the core 71, the innermost side cladding 72a, the intermediate cladding 72b, and the outermost side cladding 72c are arranged concentrically.

A fiber preform was fabricated by means of VAD method. Moreover, Yb was doped by means of solution method. At this time, the cylindrical column-shaped fiber preform was externally grinded so that the cross-sectional shape thereof became a regular octagon as illustrated in FIG. 8. The obtained fiber preform was drawn until the circumcircle diameter of the cross-section of the glass became approximately 380 μm. At this time, a polymer cladding material having a refractive index lower than that of the glass was coated and cured on the outer periphery of the glass, to thereby form a structure where the pumping light is confined in the glass cladding. Furthermore, the outer periphery thereof was coated with a protective UV curing resin.

$Yb_2O_3$ in the core was 0.68 mole percent, $P_2O_5/Yb_2O_3$ was 17.79, $Al_2O_3/Yb_2O_3$ was 18.87, and $Al_2O_3/P_2O_5$ was 1.06. Moreover, the relative refractive index difference (Δ) of the core was 0.28%. Furthermore, the cladding NA obtained from the relative refractive index difference between the glass cladding which guides pumping light and the polymer cladding which confines light, was approximately 0.47.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a pulse fiber laser of initial output of 22 W, the amount of output reduction after 100-hour operation was less than or equal to 3%. This amount of output reduction includes, in addition to an increase in loss in the optical fiber, reductions caused by temperature changes and variations in measurements. Therefore, it was thought that the output reduction caused by an increase in loss due to photodarkening was less than or equal to 1%.

The obtained Yb-doped optical fiber and the evaluation results thereof are shown in Table 2.

Example 8

Figure 9:
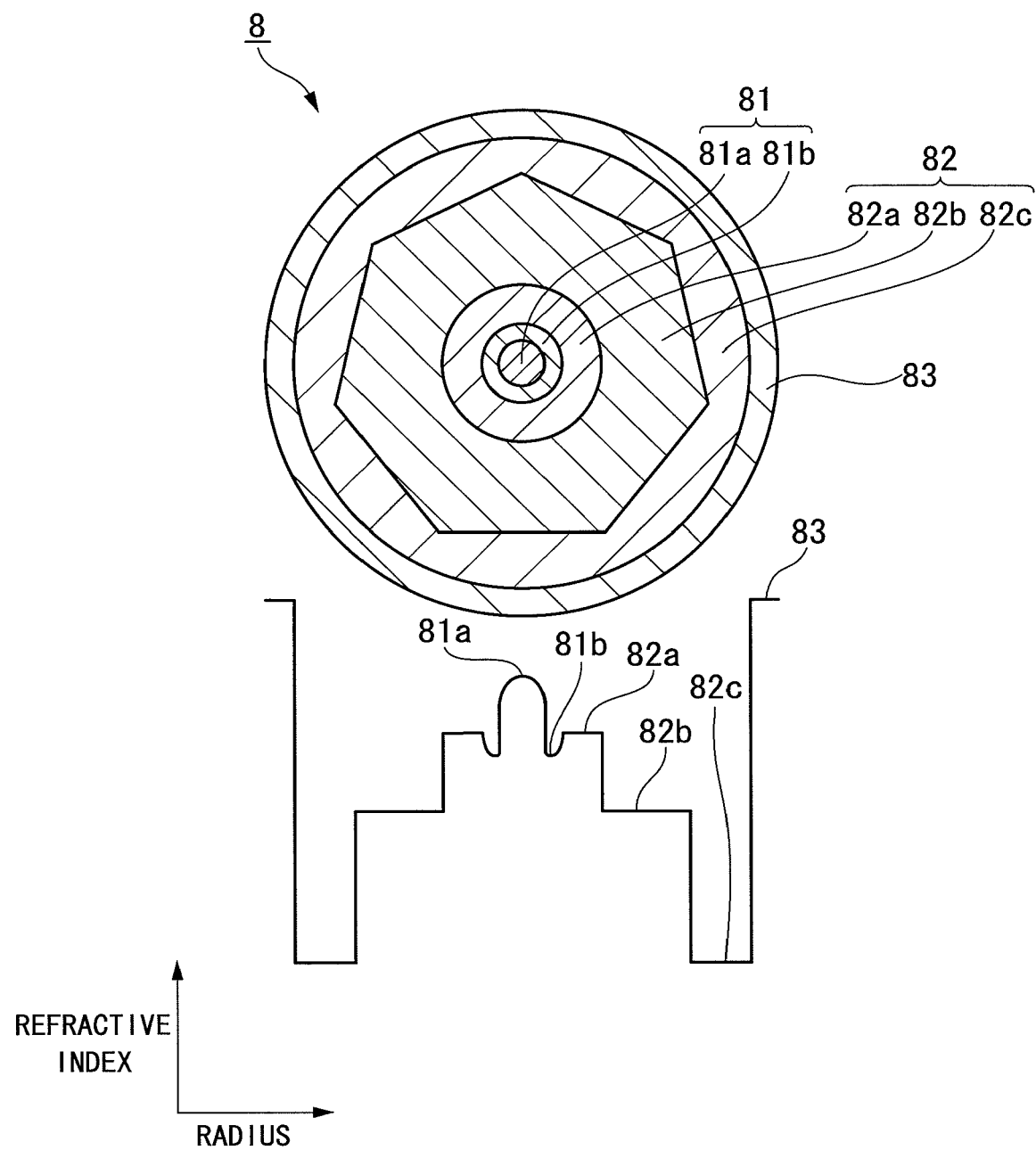
FIG. 9 is a diagram showing a cross-section taken parallel to the radial direction and a refractive index profile of a Yb-doped optical fiber fabricated in Example 8.

A Yb-doped optical fiber of the structure shown in FIG. 9 was fabricated. FIG. 9 is a drawing showing a cross-section of a Yb-doped optical fiber 8 and the refractive index profile thereof, the cross-section being parallel to the radial direction. The Yb-doped optical fiber 8 is a triple-cladding fiber having a three-layer structured cladding 82 and a two-layer structured core 81. That is to say, a ring groove 81b is arranged on the outer periphery of a center core 81a, an innermost side cladding 82a is arranged on the outer periphery of the ring groove 81b, an intermediate cladding 82b is arranged on the outer periphery of the innermost side cladding 82a, an outermost side cladding 82c is arranged on the outer periphery of the intermediate cladding 82b, and a protective coating layer 83 is arranged on the outer periphery of the outermost side cladding 82c. Moreover, the cross-sectional shape of the intermediate cladding 82b is a regular heptagon, and the center core 81a, the ring groove 81b, the innermost side cladding 82a, the intermediate cladding 82b, and the outermost side cladding 82c are arranged concentrically.

In addition to Al, P, and Yb, Ge was doped to the core. A fiber preform was fabricated by means of MCVD method. Moreover, Yb was doped by means of solution method. At this time, the cylindrical column-shaped fiber preform was externally grinded so that the cross-sectional shape thereof became a regular heptagon as illustrated in FIG. 9. The obtained fiber preform was drawn until the circumcircle diameter of the cross-section of the glass became approximately 400 μm. At this time, a polymer cladding material having a refractive index lower than that of the glass was coated and cured on the outer periphery of the glass, to thereby form a structure where the pumping light is confined in the glass cladding. Furthermore, the outer periphery thereof was coated with a protective UV curing resin.

$Yb_2O_3$ in the core was 0.28 mole percent, $P_2O_5/Yb_2O_3$ was 5.79, $Al_2O_3/Yb_2O_3$ was 7.61, $Al_2O_3/P_2O_5$ was 1.31, and $GeO_2$ was 0.83 mole percent. Moreover, the relative refractive index difference (Δ) of the core was 0.27%. Furthermore, the cladding NA obtained from the relative refractive index difference between the glass cladding which guides pumping light and the polymer cladding which confines light, was approximately 0.46.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a pulse fiber laser of initial output of 11.3 W, the amount of output reduction after 100-hour operation was less than or equal to 1%. This amount of output reduction includes, in addition to an increase in loss in the optical fiber, reductions caused by temperature changes and variations in measurements. Therefore, it was thought that almost no output reduction was caused by an increase in loss due to photodarkening.

When grating structures were fabricated in the core of this Yb-doped optical fiber by means of excimer exposure, three types of fiber gratings with reflectances of 100%, 10%, and 4% respectively with respect to the light of wavelength 1,064 nm were fabricated. Therefore, it was confirmed that a fiber grating having an arbitrary reflectance can be fabricated.

The obtained Yb-doped optical fiber and the evaluation results thereof are shown in Table 2.

Example 9

Figure 10:
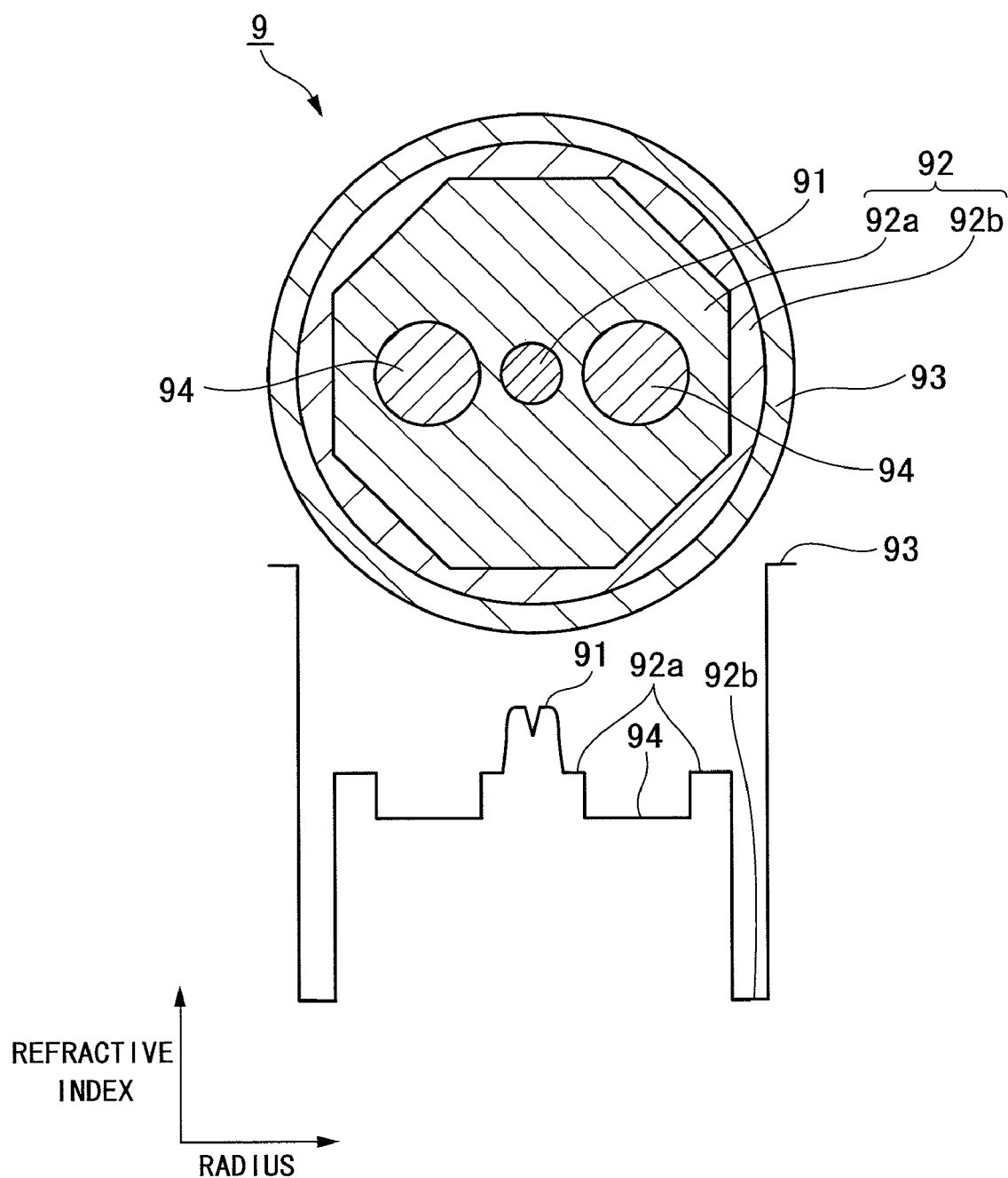
FIG. 10 is a diagram showing a cross-section taken parallel to the radial direction and a refractive index profile of a Yb-doped optical fiber fabricated in Example 9.

A Yb-doped optical fiber of the structure shown in FIG. 10 was fabricated. FIG. 10 is a drawing showing a cross-section of a Yb-doped optical fiber 9 and the refractive index profile thereof, the cross-section being parallel to the radial direction. The Yb-doped optical fiber 9 is a double-cladding fiber having a two-layer structured cladding 92, in which an inner side cladding 92a is arranged on the outer periphery of a core 91, an outer side cladding 92b is arranged on the outer periphery of the inner side cladding 92a, and a protective coating layer 93 is arranged on the outer periphery of the outer side cladding 92b. Moreover, in the inner side cladding 92a, a pair of stress applying sections 94 is arranged in positions symmetric about the core 91. Furthermore, the cross-sectional shape of the inner side cladding 92a is a regular octagon, and the core 91, the inner side cladding 92a, and the outer side cladding 92b are arranged concentrically.

In addition to Al, P, and Yb, F was doped to the core. A fiber preform was fabricated by means of MCVD method. Moreover, Yb was doped by means of solution method. At this time, the cylindrical column-shaped fiber preform was externally grinded so that the cross-sectional shape thereof became a regular octagon as illustrated in FIG. 10. Furthermore, in the central axial direction of this fiber preform, a pair of holes was formed so as to be arranged symmetric about the core, and a stress applying glass fabricated with boron doped thereto was respectively inserted therethrough. Subsequently, the obtained fiber preform was drawn until the circumcircle diameter of the cross-section of the glass became approximately 250 μm. At this time, a polymer cladding material having a refractive index lower than that of the glass was coated and cured on the outer periphery of the glass, to thereby form a structure where the pumping light is confined in the glass cladding. Furthermore, the outer periphery thereof was coated with a protective UV curing resin.

There was obtained a polarization maintaining optical fiber where $Yb_2O_3$ in the core was 0.60 mole percent, $P_2O_5/Yb_2O_3$ was 19.17, $Al_2O_3/Yb_2O_3$ was 20.17, $Al_2O_3/P_2O_5$ was 1.05, and F was 0.40 mole percent. Moreover, the relative refractive index difference (Δ) of the core was 0.18%.

Furthermore, the cladding NA obtained from the relative refractive index difference between the glass cladding which guides pumping light and the polymer cladding which confines light, was approximately 0.43.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a pulse fiber laser of initial output of 11.3 W, the amount of output reduction after 100-hour operation was less than or equal to 1%. This amount of output reduction includes, in addition to an increase in loss in the optical fiber, reductions caused by temperature changes and variations in measurements. Therefore, it was thought that almost no output reduction was caused by an increase in loss due to photodarkening.

The obtained Yb-doped optical fiber and the evaluation results thereof are shown in Table 2.

Example 10

Figure 11:
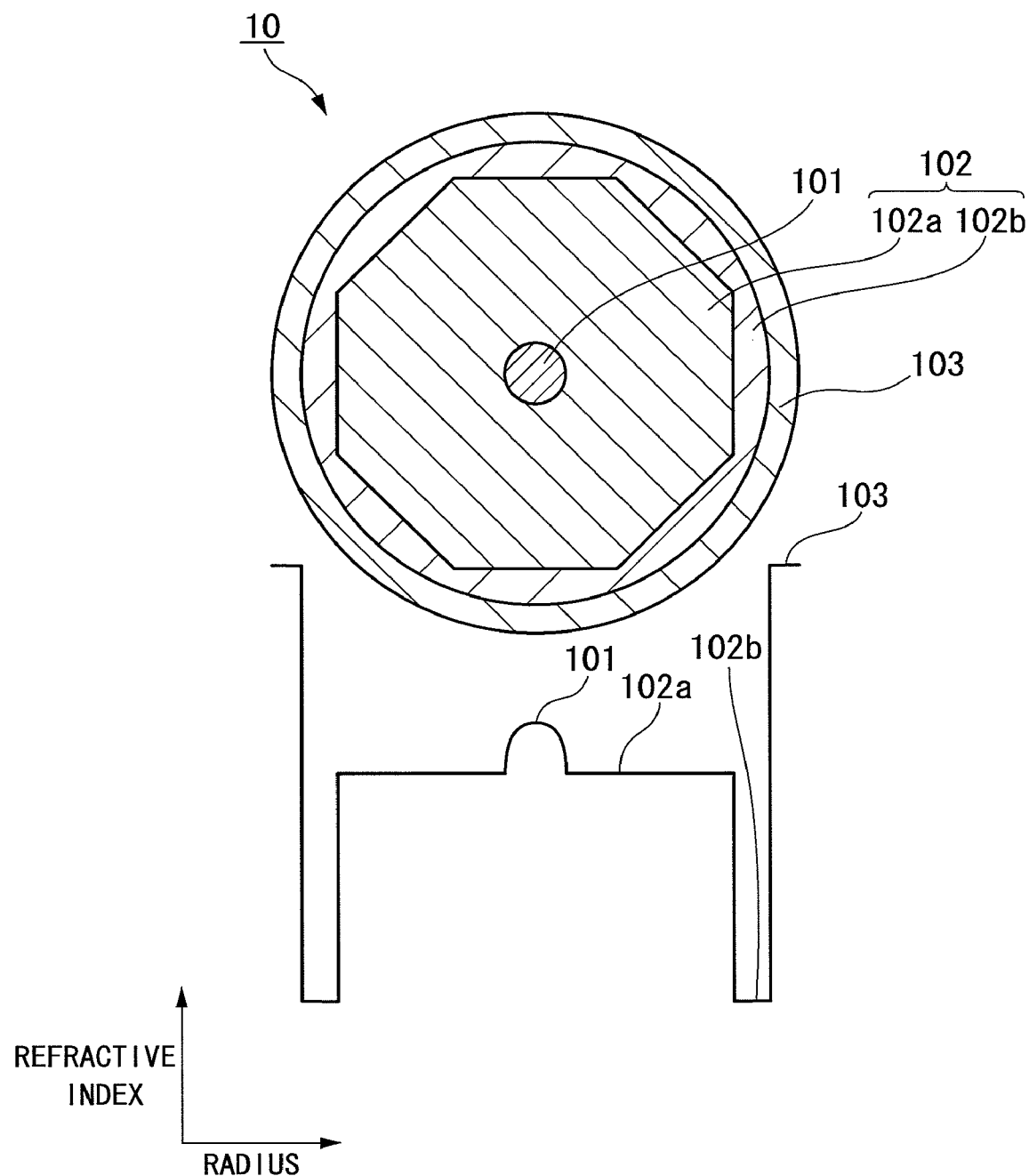
FIG. 11 is a diagram showing a cross-section taken parallel to the radial direction and a refractive index profile of a Yb-doped optical fiber fabricated in Example 10.

A Yb-doped optical fiber of the structure shown in FIG. 11 was fabricated. FIG. 11 is a drawing showing a cross-section of a Yb-doped optical fiber 10 and the refractive index profile thereof, the cross-section being parallel to the radial direction. The Yb-doped optical fiber 10 is a double-cladding fiber having a two-layer structured cladding 102, in which an inner side cladding 102a is arranged on the outer periphery of a core 101, an outer side cladding 102b is arranged on the outer periphery of the inner side cladding 102a, and a protective coating layer 103 is arranged on the outer periphery of the outer side cladding 102b. Moreover, the cross-sectional shape of the inner side cladding 102a is a regular octagon, and the core 101, the inner side cladding 102a, and the outer side cladding 102b are arranged concentrically.

In addition to Al, P, and Yb, Ge and F were doped to the core. A fiber preform was fabricated by means of VAD method. Moreover, Yb was doped by means of solution method. At this time, the cylindrical column-shaped fiber preform was externally grinded so that the cross-sectional shape thereof became a regular octagon as illustrated in FIG. 11. The obtained fiber preform was drawn until the circumcircle diameter of the cross-section of the glass became approximately 420 μm. At this time, a polymer cladding material having a refractive index lower than that of the glass was coated and cured on the outer periphery of the glass, to thereby form a structure where the pumping light is confined in the glass cladding. Furthermore, the outer periphery thereof was coated with a protective UV curing resin.

$Yb_2O_3$ in the core was 0.26 mole percent, $P_2O_5/Yb_2O_3$ was 6.62, $Al_2O_3/Yb_2O_3$ was 9.04, $Al_2O_3/P_2O_5$ was 1.37, $GeO_2$ was 0.92 mole percent, and F was 0.35 mole percent. Moreover, the relative refractive index difference (Δ) of the core was 0.21%. Furthermore, the cladding NA obtained from the relative refractive index difference between the glass cladding which guides pumping light and the polymer cladding which confines light, was approximately 0.46.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a fiber laser of initial output of 11.3 W, the amount of output reduction after 100-hour operation was less than or equal to 1%. This amount of output reduction includes, in addition to an increase in loss in the optical fiber, reductions caused by temperature changes and variations in measurements. Therefore, it was thought that almost no output reduction was caused by an increase in loss due to photodarkening.

When grating structures were fabricated in the core of this Yb-doped optical fiber by excimer exposure, three types of fiber gratings with reflectances of 100%, 10%, and 4% respectively with respect to the light of wavelength 1,064 nm were fabricated. Therefore, it was confirmed that a fiber grating having an arbitrary reflectance can be fabricated.

The obtained Yb-doped optical fiber and the evaluation results thereof are shown in Table 2.

Example 11

A double-cladding fiber was fabricated in a manner similar to that in Example 4 except that: B was doped to the core in addition to Al, P, and Yb; the doping amounts of Al, P, and Yb were different; and a fiber preform, which was externally grinded so that the cross-sectional shape thereof would become a D shape, was drawn until the circumcircle diameter of the cross-section of the glass became approximately 125 μm.

$Yb_2O_3$ in the core was 0.31 mole percent, $P_2O_5/Yb_2O_3$ was 22.29, $Al_2O_3/Yb_2O_3$ was 25.23, $Al_2O_3/P_2O_5$ was 1.13, and $B_2O_5$ was 0.3 mole percent. Moreover, the relative refractive index difference ($\Delta$) of the core was 0.22%. Furthermore, the cladding NA obtained from the relative refractive index difference between the glass cladding which guides pumping light and the polymer cladding which confines light, was approximately 0.46.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a pulse fiber laser of initial output of 20.0 W, the amount of output reduction after 100-hour operation was less than or equal to 1%. This amount of output reduction includes, in addition to an increase in loss in the optical fiber, reductions caused by temperature changes and variations in measurements. Therefore, it was thought that almost no output reduction was caused by an increase in loss due to photodarkening.

The obtained Yb-doped optical fiber and the evaluation results thereof are shown in Table 2.

Example 12

A triple-cladding fiber was fabricated in a manner similar to that in Example 7 except that: Tm was doped to the core in addition to Al, P, and Yb; the doping amounts of Al, P, and Yb were different; and a fiber preform, which was externally grinded so that the cross-sectional shape thereof would become a regular octagon, was drawn until the circumcircle diameter of the cross-section of the glass became approximately 250 μm. Tm was doped by means of solution method.

$Yb_2O_3$ in the core was 0.25 mole percent, $P_2O_5/Yb_2O_3$ was 25.80, $Al_2O_3/Yb_2O_3$ was 27.52, $Al_2O_3/P_2O_5$ was 1.07, and $Tm_2O_3$ was 0.12 mole percent. Moreover, the relative refractive index difference ($\Delta$) of the core was 0.25%. Furthermore, the cladding NA obtained from the relative refractive index difference between the glass cladding which guides pumping light and the polymer cladding which confines light, was approximately 0.46.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a pulse fiber laser of initial output of 15 W, the amount of output reduction after 100-hour operation was less than or equal to 3%. This amount of output reduction includes, in addition to an increase in loss in the optical fiber, reductions caused by temperature changes and variations in measurements. Therefore, it was thought that the output reduction caused by an increase in loss due to photodarkening was less than or equal to 1%.

The obtained Yb-doped optical fiber and the evaluation results thereof are shown in Table 2.

Example 13

A triple-cladding fiber was fabricated in a manner similar to that in Example 8 except that: Nd was doped to the core in addition to Al, P, and Yb; the doping amounts of Al, P, and Yb were different; and a fiber preform, which was externally grinded so that the cross-sectional shape thereof would become a regular heptagon, was drawn until the circumcircle diameter of the cross-section of the glass became approximately 250 μm. Nd was doped by means of solution method.

$Yb_2O_3$ in the core was 0.30 mole percent, $P_2O_5/Yb_2O_3$ was 13.67, $Al_2O_3/Yb_2O_3$ was 16.53, $Al_2O_3/P_2O_5$ was 1.21, and $Nd_2O_3$ was 0.15 mole percent. Moreover, the relative refractive index difference ($\Delta$) of the core was 0.18%. Furthermore, the cladding NA obtained from the relative refractive index difference between the glass cladding which guides pumping light and the polymer cladding which confines light, was approximately 0.43.

Almost no increase was found in loss caused by photodarkening in the Yb-doped optical fiber, and the amount of increase in loss found by the above evaluation method was less than or equal to 0.01 dB.

Moreover, a fiber laser was fabricated with use of the obtained Yb-doped optical fiber, and changes in the optical output over time were evaluated. As a result, with a pulse fiber laser of initial output of 15.8 W, the amount of output reduction after 100-hour operation was less than or equal to 2%. This amount of output reduction includes, in addition to an increase in loss in the optical fiber, reductions caused by temperature changes and variations in measurements. Therefore, it was thought that the output reduction caused by an increase in loss due to photodarkening was less than or equal to 1%.

The obtained Yb-doped optical fiber and the evaluation results thereof are shown in Table 3.

Comparative Example 1

A single-cladding fiber was fabricated in a manner similar to that in Example 1 except that: Al, Yb, and Ge were doped to the core and P was not doped; the doping amounts of Al and Yb were different; and a fiber preform was drawn until the outer glass diameter became approximately 200 μm.

$Yb_2O_3$ in the core was 0.51 mole percent, $Al_2O_3/Yb_2O_3$ was 0.39, $Al_2O_3$ was 0.2 mole percent, and $GeO_2$ was 0.23 mole percent. That is to say, $Al_2O_3/Yb_2O_3$ was found to be outside the range of the present invention. Moreover, the relative refractive index difference (Δ) of the core was 0.27%.

A significant increase in loss caused by photodarkening in the Yb-doped optical fiber was found, and the amount of increase in loss due to the above evaluation method was 3.8 dB.

A fiber laser was fabricated using the obtained Yb-doped optical fiber, and changes in the optical output over time were evaluated. As a result, with a pulse fiber laser of initial output of 20 W, the amount of output reduction after 100-hour operation was 30% or higher.

The obtained Yb-doped optical fiber and the evaluation results thereof are shown in Table 3.

Comparative Example 2

A double-cladding fiber was fabricated in a manner similar to that in Example 6 except that: the doping amounts of Al, P, and Yb were different; and a fiber preform, which was externally grinded so that the cross-sectional shape thereof would become a regular heptagon, was drawn until the circumcircle diameter of the cross-section of the glass became approximately 300 μm.

$Yb_2O_3$ in the core was 0.27 mole percent, $P_2O_5/Yb_2O_3$ was 1.23, $Al_2O_3/Yb_2O_3$ was 4.95, and $Al_2O_3/P_2O_5$ was 4.01. That is to say, $P_2O_5/Yb_2O_3$ and $Al_2O_3/P2O5$ were outside the range of the present invention. Moreover, the relative refractive index difference (Δ) of the core was 0.20%. Furthermore, the cladding NA obtained from the relative refractive index difference between the glass cladding which guides pumping light and the polymer cladding which confines light, was approximately 0.43.

Figure 12:
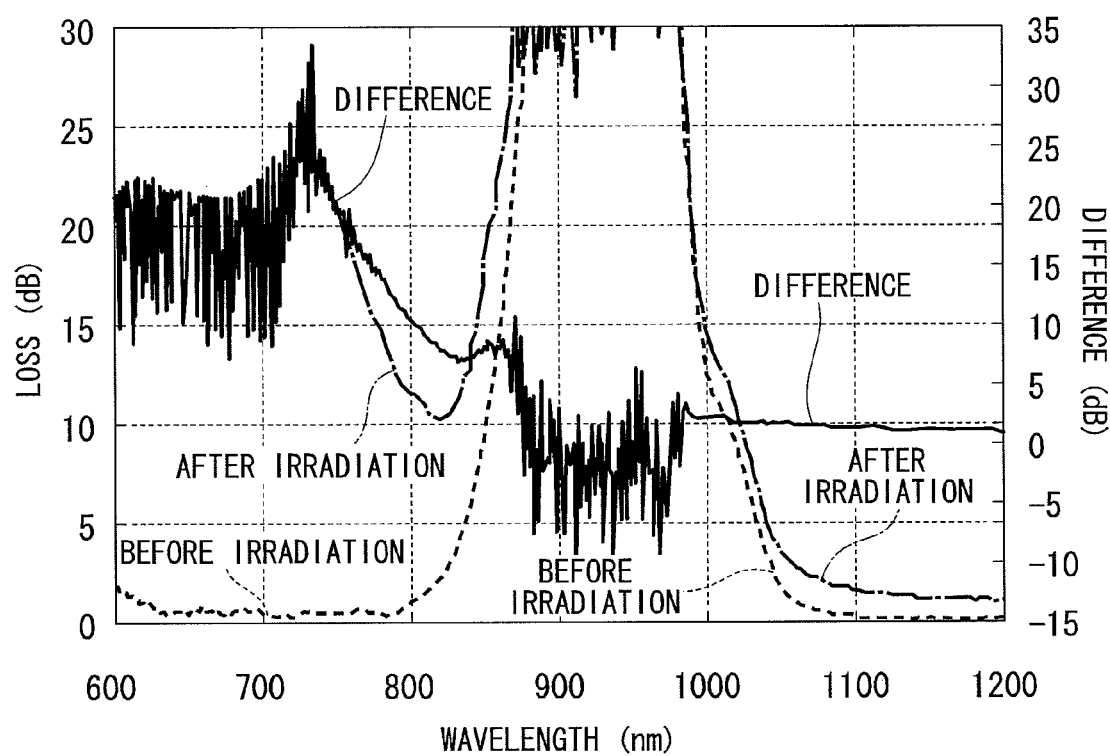
FIG. 12 is a graph showing a relationship between the amount of loss increase and its difference with respect to the wavelength of the difference thereof before and after pumping light irradiation in the fabricated fiber of Comparative Example 2.

A significant increase in loss caused by photodarkening in the Yb-doped optical fiber was found, and the amount of increase in loss due to the above evaluation method was 10.6 dB. The relationship between the loss amount before and after pumping light irradiation and the wavelength dependence of the difference thereof at this time is illustrated as a graph in FIG. 12.

A fiber laser was fabricated using the obtained Yb-doped optical fiber, and changes in the optical output over time were evaluated. As a result, with a pulse fiber laser of initial output of 12 W, the amount of output reduction after 100-hour operation was 50% or higher.

The obtained Yb-doped optical fiber and the evaluation results thereof are shown in Table 3.

Comparative Example 3

Al, P, and Yb were doped to the core, and a fiber preform was fabricated by means of MCVD method. Yb was doped by means of solution method. As a result, in the obtained fiber preform, the core exhibited opaque and crystallization of glass occurred therein. Then, this fiber preform was drawn, and the concentrations of the doping components in the core were measured. As a result, $Yb_2O_3$ was 0.35 mole percent, $P_2O_5/Yb_2O_3$ was 6.31, $Al_2O_3/Yb_2O_3$ was 4.57, and $Al_2O_3/P_2O_5$ was 0.72. Moreover, the relative refractive index difference (Δ) of the core was 0.17%.

The obtained Yb-doped optical fiber and the evaluation results thereof are shown in Table 3.

Comparative Example 4

A double-cladding fiber was fabricated in a manner similar to that in Example 2 except that: the doping amounts of Al, P, and Yb were different; and further a polymer cladding material was coated and cured so as to form a double-cladding structure.

$Yb_2O_3$ in the core was 0.45 mole percent, $P_2O_5/Yb_2O_3$ was 30.7, $Al_2O_3/Yb_2O_3$ was 31.1, and $Al_2O_3/P_2O_5$ was 1.01. That is to say, $P_2O_5/Yb_2O_3$ was found to be outside the range of the present invention. Moreover, the relative refractive index difference (Δ) of the core was 0.27%. Furthermore, the cladding NA obtained from the relative refractive index difference between the glass cladding which guides pumping light and the polymer cladding which confines light, was approximately 0.46.

The obtained Yb-doped optical fiber had a significant transmission loss reaching approximately 160 dB/km.

A fiber laser was fabricated using the obtained Yb-doped optical fiber, and the optical output was evaluated. As a result, the initial output was only realized up to 6 W.

The obtained Yb-doped optical fiber and the evaluation results thereof are shown in Table 4.

Comparative Example 5

A double-cladding fiber was fabricated in a manner similar to that in Example 5 except that the doping amounts of Al, P, and Yb were different.

$Yb_2O_3$ in the core was 0.22 mole percent, $P_2O_5/Yb_2O_3$ was 2.14, $Al_2O_3/Yb_2O_3$ was 4.91, and $Al_2O_3/P_2O_5$ was 2.30. That is to say, $P_2O_5/Yb_2O_3$ was found to be outside the range of the present invention. Moreover, the relative refractive index difference (Δ) of the core was 0.30%. Furthermore, the cladding NA obtained from the relative refractive index difference between the glass cladding which guides pumping light and the polymer cladding which confines light, was approximately 0.44.

A significant increase in loss caused by photodarkening in the Yb-doped optical fiber was found, and the amount of increase in loss due to the above evaluation method was 1.7 dB.

A fiber laser was fabricated using the obtained Yb-doped optical fiber, and changes in the optical output over time were evaluated. As a result, with a pulse fiber laser of initial output of 12 W, the amount of output reduction after 100-hour operation was 25% or higher.

The obtained Yb-doped optical fiber and the evaluation results thereof are shown in Table 4.

Comparative Example 6

A single-cladding fiber was fabricated in a manner similar to that in Example 2 except that the doping amounts of Al, P, and Yb were different.

$Yb_2O_3$ in the core was 0.28 mole percent, $P_2O_5/Yb_2O_3$ was 20.29, $Al_2O_3/Yb_2O_3$ was 38.57, and $Al_2O_3/P_2O_5$ was 1.90. That is to say, $Al_2O_3/Yb_2O_3$ was found to be outside the range of the present invention. Moreover, the relative refractive index difference (Δ) of the core was 0.55%.

The amount of increase in loss found in the obtained Yb-doped optical fiber by the above evaluation method was less than or equal to approximately 0.01 dB.

A fiber laser was fabricated using the obtained Yb-doped optical fiber, and the optical output was evaluated. The relative refractive index difference (Δ) was significant and consequently the mode field diameter of the optical fiber became small. Therefore, stimulated Raman scattering occurred, and only a fiber laser of initial output of 5 W was realized. Moreover, a fiber laser was fabricated using the obtained Yb-doped optical fiber, and changes in the optical output over time were evaluated. As a result, with a pulse fiber laser of initial output of 5 W, the amount of output reduction after 100-hour operation was 8% or higher.

The obtained Yb-doped optical fiber and the evaluation results thereof are shown in Table 4.

Comparative Example 7

Al, P, and Yb were doped to the core, and a fiber preform was fabricated by means of MCVD method. Yb was doped by means of solution method. As a result, in the obtained fiber preform, the core was opaque, and crystallization of glass occurred therein. Then, this fiber preform was drawn, and the concentrations of the doping components in the core were measured. As a result, $Yb_2O_3$ was 0.26 mole percent, $P_2O_5/Yb_2O_3$ was 2.88, $Al_2O_3/Yb_2O_3$ was 2.88, and $Al_2O_3/P_2O_5$ was 1.00.

The obtained Yb-doped optical fiber and the evaluation results thereof are shown in Table 4.

Comparative Example 8

A double-cladding fiber was fabricated in a manner similar to that in Example 6 except that the doping amounts of Al, P, and Yb were different.

$Yb_2O_3$ in the core was 0.48 mole percent, $P_2O_5/Yb_2O_3$ was 9.02, $Al_2O_3/Yb_2O_3$ was 24.38, and $Al_2O_3/P_2O_5$ was 2.70. That is to say, $Al_2O_3/P_2O_5$ was found to be outside the range of the present invention. Moreover, the relative refractive index difference ($\Delta$) of the core was 0.85%. Furthermore, the cladding NA obtained from the relative refractive index difference between the glass cladding which guides pumping light and the polymer cladding which confines light, was approximately 0.46.

A fiber laser was fabricated using the obtained Yb-doped optical fiber, and the optical output was evaluated. The relative refractive index difference ($\Delta$) was significant and consequently the mode field diameter of the optical fiber became small. Therefore, stimulated Raman scattering occurred, and only a fiber laser of initial output of 7 W was realized.

The obtained Yb-doped optical fiber and the evaluation results thereof are shown in Table 4.

TABLE 1

|  | Example 1 | Example 2 | Example 3 | Example 4 | Example 5 | Example 6 |
|---|---|---|---|---|---|---|
| $Yb_2O_3$ concentration (mole percent) | 0.46 | 0.38 | 0.09 | 0.52 | 0.33 | 0.39 |
| $P_2O_5$ concentration (mole percent) | 3.05 | 11.40 | 2.01 | 1.58 | 1.00 | 4.69 |
| $Al_2O_3$ concentration (mole percent) | 7.34 | 11.92 | 2.52 | 1.61 | 1.76 | 7.18 |
| $P_2O_5$ concentration/ $Yb_2O_3$ concentration | 6.61 | 29.71 | 22.33 | 3.04 | 3.02 | 11.98 |
| $Al_2O_3$ concentration/ $Yb_2O_3$ concentration | 15.92 | 31.06 | 28.00 | 3.10 | 5.34 | 18.34 |
| $Al_2O_3$ concentration/ $P_2O_5$ concentration | 2.41 | 1.05 | 1.25 | 1.02 | 1.76 | 1.53 |
| Other contained element (concentration, mole percent) | — | — | — | — | — | — |
| Core relative refractive index ($\Delta$) (%) | 0.29 | 0.14 | 0.07 | 0.24 | 0.29 | 0.13 |
| Cladding structure | Single | Single | Single | Double | Double | Double |
| Glass cladding (circumcircle) diameter (µm) | 125 | 125 | 125 | 400 | 125 | 420 |
| Photodarkening loss increase amount (dB) | ≦0.01 | ≦0.01 | ≦0.01 | ≦0.01 | ≦0.01 | ≦0.01 |

TABLE 2

|  | Example 7 | Example 8 | Example 9 | Example 10 | Example 11 | Example 12 |
|---|---|---|---|---|---|---|
| $Yb_2O_3$ concentration (mole percent) | 0.68 | 0.28 | 0.60 | 0.26 | 0.31 | 0.25 |

TABLE 2-continued

|  | Example 7 | Example 8 | Example 9 | Example 10 | Example 11 | Example 12 |
|---|---|---|---|---|---|---|
| $P_2O_5$ concentration (mole percent) | 12.10 | 1.62 | 11.5 | 1.72 | 6.91 | 6.45 |
| $Al_2O_3$ concentration (mole percent) | 12.83 | 2.13 | 12.1 | 2.35 | 7.82 | 6.88 |
| $P_2O_5$ concentration/ $Yb_2O_3$ concentration | 17.79 | 5.79 | 19.17 | 6.62 | 22.29 | 25.80 |
| $Al_2O_3$ concentration/ $Yb_2O_3$ concentration | 18.87 | 7.61 | 20.17 | 9.04 | 25.23 | 27.52 |
| $Al_2O_3$ concentration/ $P_2O_5$ concentration | 1.06 | 1.31 | 1.05 | 1.37 | 1.13 | 1.07 |
| Other contained element (concentration, mole percent) | — | $GeO_2$ 0.83 | F 0.40 | $GeO_2$ 0.92 F 0.35 | $B_2O_5$ 0.3 | $Tm_2O_3$ 0.12 |
| Core relative refractive index (Δ) (%) | 0.28 | 0.27 | 0.18 | 0.21 | 0.22 | 0.25 |
| Cladding structure | Triple | Triple | Double | Double | Double | Triple |
| Glass cladding (circumcircle) diameter (μm) | 380 | 400 | 250 | 420 | 125 | 250 |
| Photodarkening loss increase amount (dB) | ≦0.01 | ≦0.01 | ≦0.01 | ≦0.01 | ≦0.01 | ≦0.01 |

TABLE 3

|  | Example 13 | Comparative Example 1 | Comparative Example 2 | Comparative Example 3 |
|---|---|---|---|---|
| $Yb_2O_3$ concentration (mole percent) | 0.30 | 0.51 | 0.27 | 0.35 |
| $P_2O_5$ concentration (mole percent) | 4.1 | — | 0.33 | 2.21 |
| $Al_2O_3$ concentration (mole percent) | 4.96 | 0.2 | 1.34 | 1.6 |
| $P_2O_5$ concentration/ $Yb_2O_3$ concentration | 13.67 | — | 1.23 | 6.31 |
| $Al_2O_3$ concentration/ $Yb_2O_3$ concentration | 16.53 | 0.39 | 4.95 | 4.57 |
| $Al_2O_3$ concentration/ $P_2O_5$ concentration | 1.21 | — | 4.01 | 0.72 |
| Other contained element (concentration, mole percent) | $Nd_2O_3$ 0.15 | $GeO_2$ 0.23 | — | — |
| Core relative refractive index (Δ) (%) | 0.18 | 0.27 | 0.20 | 0.17 |
| Cladding structure | Triple | Single | Double | — |
| Glass cladding (circumcircle) diameter (μm) | 250 | 200 | 300 | — |
| Photodarkening loss increase amount (dB) | ≦0.01 | 3.8 | 10.6 | — |

TABLE 4

|  | Comparative Example 4 | Comparative Example 5 | Comparative Example 6 | Comparative Example 7 | Comparative Example 8 |
|---|---|---|---|---|---|
| $Yb_2O_3$ concentration (mole percent) | 0.45 | 0.22 | 0.28 | 0.26 | 0.48 |
| $P_2O_5$ concentration (mole percent) | 13.8 | 0.47 | 5.68 | 0.75 | 4.33 |

TABLE 4-continued

| | Comparative Example 4 | Comparative Example 5 | Comparative Example 6 | Comparative Example 7 | Comparative Example 8 |
|---|---|---|---|---|---|
| $Al_2O_3$ concentration (mole percent) | 14.0 | 1.08 | 10.8 | 0.75 | 11.7 |
| $P_2O_5$ concentration/ $Yb_2O_3$ concentration | 30.7 | 2.14 | 20.29 | 2.88 | 9.02 |
| $Al_2O_3$ concentration/ $Yb_2O_3$ concentration | 31.1 | 4.91 | 38.57 | 2.88 | 24.38 |
| $Al_2O_3$ concentration/ $P_2O_5$ concentration | 1.01 | 2.30 | 1.90 | 1.00 | 2.70 |
| Other contained element (concentration, mole percent) | — | — | — | — | — |
| Core relative refractive index ($\Delta$) (%) | 0.27 | 0.30 | 0.55 | — | 0.85 |
| Cladding structure | Double | Double | Single | — | Double |
| Glass cladding (circumcircle) diameter (μm) | 125 | 125 | 125 | — | 420 |
| Photodarkening loss increase amount (dB) | $\leq$0.01 | 1.7 | $\leq$0.01 | — | $\leq$0.01 |

As can be understood from Table 1 to Table 4, in those cases where the core contains Yb, Al, and P, from the viewpoint to the $Yb_2O_3$-equivalent concentration, the $P_2O_5$-equivalent concentration, and the $Al_2O_3$-equivalent concentration in the core: if the $Yb_2O_3$-equivalent concentration is 0.09 to 0.68 mole percent; the molar ratio between the $P_2O_5$-equivalent concentration and the $Yb_2O_3$-equivalent concentration is 3 to 30; the molar ratio between the $Al_2O_3$-equivalent concentration and the $Yb_2O_3$-equivalent concentration is 3 to 32; and the molar ratio between the $Al_2O_3$-equivalent concentration and the $P_2O_5$-equivalent concentration is 1 to 2.5, it is possible to sufficiently suppress loss caused by photodarkening. The invention disclosed in Patent Document 2 mentioned above does not disclose these molar ratios, and therefore the comparative examples of the present application include ones which correspond to them in Patent Document 2. Consequently, in the invention disclosed in Patent Document 2, it is difficult to sufficiently suppress photodarkening as with the invention of the present application.

Comparative Example 9

Figure 14:
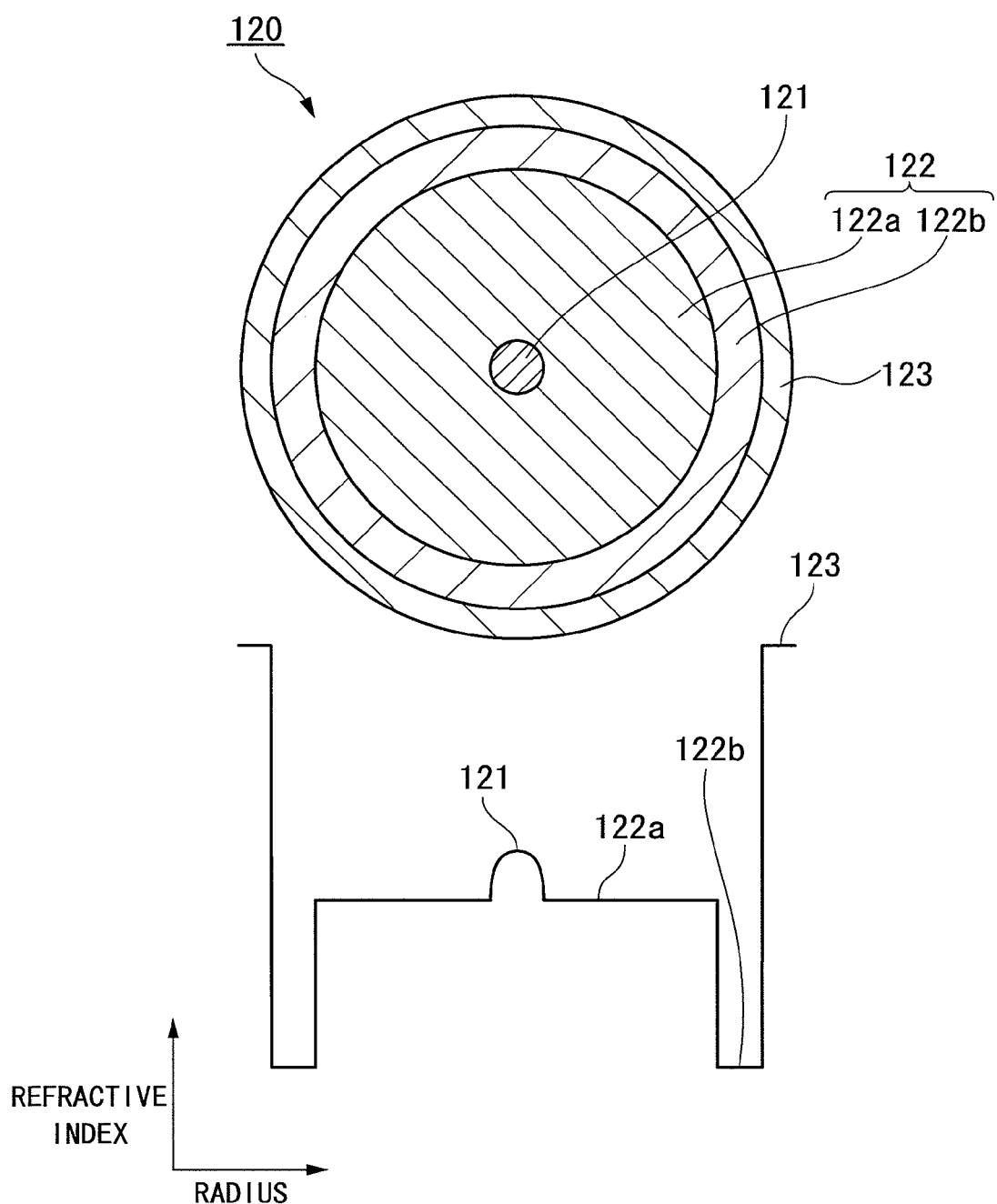
FIG. 14 is a drawing showing a cross-section taken parallel to the radial direction and a refractive index profile of a Yb-doped optical fiber of Comparative Examples 9 to 11.

A Yb-doped optical fiber of the structure shown in FIG. 14 was fabricated. FIG. 14 is a drawing showing a cross-section of a Yb-doped optical fiber 120 and the refractive index profile thereof, the cross-section being parallel to the radial direction. The Yb-doped optical fiber 120 is a double-cladding fiber having a two-layer structured cladding 122, in which an inner side cladding 122a is arranged on the outer periphery of a core 121, an outer side cladding 122b is arranged on the outer periphery of the inner side cladding 122a, and a protective coating layer 123 is arranged on the outer periphery of the outer side cladding 122b.

The double-cladding fiber of Comparative Example 9 was fabricated in a manner similar to that in Example 4 except that: a fiber preform in a sectionally circular shape was drawn so that the diameter of the inner side cladding 122b would become approximately 200 μm; and the doping amounts of Al, P, and Yb were different.

$Yb_2O_3$ in the core was 1.3 mole percent, $GeO_2$ was 1.2 mole percent, $P_2O_5/Yb_2O_3$ was 3.77, $Al_2O_3/Yb_2O_3$ was 11.00, and $Al_2O_3/P_2O_5$ was 2.92. That is to say, the $Yb_2O_3$ concentration and $Al_2O_3/P_2O_5$ were found to be outside the range of the present invention. Moreover, the relative refractive index difference ($\Delta$) of the core was 0.45%. The obtained Yb-doped optical fiber is shown in Table 5.

The doping amount of germanium and ytterbium are high in the obtained Yb-doped optical fiber of Comparative Example 9, and consequently, the relative refractive index of the core becomes too high and the effective core cross-sectional area could not be made sufficiently large.

Comparative Example 10

A double-cladding fiber was fabricated in a manner similar to that in Comparative Example 9 except that the doping amounts of Al, P, and Ge were different.

$Yb_2O_3$ in the core was 1.3 mole percent, $GeO_2$ was 4.5 mole percent, $P_2O_5/Yb_2O_3$ was 11.54, $Al_2O_3/Yb_2O_3$ was 8.31, and $Al_2O_3/P_2O_5$ was 0.72. That is to say, the $Yb_2O_3$ concentration and $P_2O_5/Yb_2O_3$ were found to be outside the range of the present invention. Moreover, the relative refractive index difference ($\Delta$) of the core was 0.30%. The obtained Yb-doped optical fiber is shown in Table 5.

In the obtained Yb-doped optical fiber of Comparative Example 10, phosphorus was doped to the core more than aluminum, and consequently, core crystallization occurred, transmission loss was 100 dB/km or higher, and a fiber which can be practically used was not obtained.

Comparative Example 11

A double-cladding fiber was fabricated in a manner similar to that in Comparative Example 10 except that the doping amounts of Al and P were different.

$Yb_2O_3$ in the core was 1.3 mole percent, $GeO_2$ was 4.5 mole percent, $P_2O_5/Yb_2O_3$ was 23.15, $Al_2O_3/Yb_2O_3$ was 11.00, and $Al_2O_3/P_2O_5$ was 0.48. That is to say, the $Yb_2O_3$ concentration and $P_2O_5/Yb_2O_3$ were found to be outside the range of the present invention. Moreover, the relative refractive index difference (Δ) of the core was 0.48%. The obtained Yb-doped optical fiber is shown in Table 5.

In the obtained Yb-doped optical fiber of Comparative Example 11, phosphorus was doped more than aluminum. Consequently, core crystallization occurred and transmission loss was unmeasurably high (1,000 dB/km or higher), and a fiber which can be practically used was not obtained. Moreover, the relative refractive index of the core became too high, and the effective core cross-sectional area could not be made sufficiently large.

TABLE 5

|  | Comparative Example 9 | Comparative Example 10 | Comparative Example 11 |
|---|---|---|---|
| $Yb_2O_3$ concentration (mole percent) | 1.3 | 1.3 | 1.3 |
| $P_2O_5$ concentration (mole percent) | 4.9 | 15.0 | 30.1 |
| $Al_2O_3$ concentration (mole percent) | 14.3 | 10.8 | 14.3 |
| $P_2O_5$ concentration/ $Yb_2O_3$ concentration | 3.77 | 11.54 | 23.15 |
| $Al_2O_3$ concentration/ $Yb_2O_3$ concentration | 11.00 | 8.31 | 11.00 |
| $Al_2O_3$ concentration/ $P_2O_5$ concentration | 2.92 | 0.72 | 0.48 |
| Other contained element (concentration, mole percent) | $GeO_2$ 1.2 | $GeO_2$ 4.5 | $GeO_2$ 4.5 |
| Core relative refractive index (Δ) (%) | 0.45 | 0.30 | 0.48 |
| Cladding structure | Double | Double | Double |
| Inner side cladding (circumcircle) diameter (μm) | 200 | 200 | 200 |

As can be understood from the transmission losses and core relative refractive index difference shown in Comparative Examples 9 to 11 above and from Table 5, in these Comparative Examples 9 to 11, it was not possible to realize a fiber which can be accomplished by the present invention, that has a large effective core cross-sectional area and sufficiently suppressed photodarkening, and can be used practically (with low transmission loss).

INDUSTRIAL APPLICABILITY

The present invention can be used as a laser medium for a high output power light source for material processing purposes such as welding, marking, and cutting.

DESCRIPTION OF THE REFERENCE SYMBOLS

1, 2, 3, 4, 5, 6, 7, 8, 9, 10: Ytterbium-doped optical fiber
11, 21, 31, 41, 51, 61, 71, 81, 91, 101: Core
12, 22, 32, 42, 52, 62, 72, 82, 92, 102: Cladding
42a, 52a, 62a, 92a, 102a: Inner side cladding
42b, 52b, 62b, 92b, 102b: Outer side cladding
72a, 82a: Innermost side cladding
72b, 82b: Intermediate cladding
72c, 82c: Outermost side cladding

What is claimed is:

1. An ytterbium-doped optical fiber comprising: a core which contains ytterbium, aluminum, and phosphorus, and does not contain germanium; and a cladding which surrounds this core, wherein:
   the ytterbium concentration in the core in terms of ytterbium oxide is 0.09 to 0.68 mole percent;
   a molar ratio between the phosphorus concentration in the core in terms of diphosphorus pentoxide and the ytterbium concentration in the core in terms of ytterbium oxide is 3 to 30;
   a molar ratio between the aluminum concentration in the core in terms of aluminum oxide and the ytterbium concentration in the core in terms of ytterbium oxide is 3 to 32;
   a molar ratio between the aluminum concentration in terms of aluminum oxide and the phosphorus concentration in terms of diphosphorus pentoxide is 1 to 2.5, and
   the relative refractive index difference between the core and the cladding is 0.1 to 0.25%.

2. The ytterbium-doped optical fiber according to claim 1, wherein
   the core and the cladding are composed of silica glass.

3. The ytterbium-doped optical fiber according to claim 1, wherein
   the molar ratio between the phosphorus concentration in terms of diphosphorus pentoxide and the ytterbium concentration in terms of ytterbium oxide is 5 to 30, and
   the molar ratio between the aluminum concentration in terms of aluminum oxide and the ytterbium concentration in terms of ytterbium oxide is 5 to 32.

4. The ytterbium-doped optical fiber according to claim 1, wherein
   the aluminum concentration in terms of aluminum oxide and the phosphorus concentration in terms of diphosphorus pentoxide are both 8 mole percent or lower.

5. The ytterbium-doped optical fiber according to claim 1, wherein
   the core further contains fluorine and/or boron.

6. The ytterbium-doped optical fiber according to claim 1, wherein
   the core further contains at least one type selected from the group consisting of a rare earth element other than ytterbium and a transition metal element.

7. The ytterbium-doped optical fiber according to claim 1, wherein
   at least two layers of the cladding are provided, and a refractive index of a radially inner side cladding is higher than that of an outer side cladding.

8. The ytterbium-doped optical fiber according to claim 1, wherein at least three layers of the cladding are provided, and a refractive index nc1 of a radially innermost side cladding, a refractive index nc3 of an outermost side cladding, and a refractive index nc2 of an intermediate cladding between the innermost side cladding and the outermost side cladding, satisfy a relationship nc1>nc2>nc3.

9. A fiber laser which has the ytterbium-doped optical fiber according to claim 1 as an optical amplification medium.

10. A fiber amplifier comprising the ytterbium-doped optical fiber according to claim 1 as an optical amplification medium.

* * * * *